US011279798B2

(12) United States Patent
Park et al.

(10) Patent No.: US 11,279,798 B2
(45) Date of Patent: Mar. 22, 2022

(54) POLYMER TECHNOLOGY FOR USE IN FLOW REACTORS

(71) Applicants: International Business Machines Corporation, Armonk, NY (US); The Board of Trustees of the Leland Stanford Junior University, Stanford, CA (US)

(72) Inventors: Nathaniel H. Park, San Jose, CA (US); James L. Hedrick, Pleasanton, CA (US); Pedro Luis Arrechea, San Jose, CA (US); Tim Erdmann, San Jose, CA (US); Binhong Lin, Woodbury, MN (US); Robert M. Waymouth, Palo Alto, CA (US); Caleb Nathaniel Jadrich, Palo Alto, CA (US); Vince Evan Pane, Stanford, CA (US)

(73) Assignees: INTERNATIONAL BUSINESS MACHINES CORPORATION, Armonk, NY (US); THE BOARD OF TRUSTEES OF THE LELAND STANFORD JUNIOR UNIVERSITY, Standford, CA (US)

( * ) Notice: Subject to any disclaimer, the term of this patent is extended or adjusted under 35 U.S.C. 154(b) by 0 days.

(21) Appl. No.: 16/821,286

(22) Filed: Mar. 17, 2020

(65) Prior Publication Data

US 2021/0292474 A1  Sep. 23, 2021

(51) Int. Cl.
*C08G 63/08* (2006.01)
*C08G 64/02* (2006.01)
*C08F 295/00* (2006.01)

(52) U.S. Cl.
CPC ............ *C08G 63/08* (2013.01); *C08F 295/00* (2013.01); *C08G 64/0208* (2013.01)

(58) Field of Classification Search
CPC ..... C08G 69/20; C08G 63/08; C08G 64/0208
See application file for complete search history.

(56) References Cited

U.S. PATENT DOCUMENTS

| 5,328,970 | A | 7/1994 | Inoue et al. |
| 10,364,319 | B2 | 7/2019 | Chen et al. |
| 2002/0091207 | A1* | 7/2002 | Campbell ................. C08F 2/02 526/65 |
| 2016/0096919 | A1 | 4/2016 | Bouyahyi et al. |
| 2020/0010610 | A1* | 1/2020 | Park ..................... B01J 19/0013 |

FOREIGN PATENT DOCUMENTS

CN  1277859 C  10/2005

OTHER PUBLICATIONS

Zhang et al., Fast and selective ring-opening polymerizations by alkoxides and thioureas, Nature Chemistry, Published Online: Jul. 25, 2016.*
Lin, et al. "Urea Anions: Simple, Fast, and Selective Catalysts for Ring-Opening Polymerizations" J Am. Chem. Soc. vol. 139, Feb. 2017. 8 pages.
Lin, et al. "Organic Ring-Opening Polymerization Catalysts: Reactivity Control by Balancing Acidity " Macromolecules, Apr. 2018, 7 pages.
Lou, et al. "Living Cationic Polymerization of ä-Valerolactone and Synthesis of High Molecular Weight Homopolymer and Asymmetric Telechelic and Block Copolymer." Macromolecules 2002, 35, 1190-1195. 6 pages.
Su. "Ring-Opening Polymerization." Principles of Polymer Design and Synthesis, Lecture Notes in Chemistry 82, DOI: 10.1007/978-3-642-38730-2_11.2013. 33 pages.
Chang, et al. "Recent Progress on the Synthesis of Cyclic Polymers via Ring-Expansion Strategies" Journal of Polymer Science, Part A: Polymer Chemistry 2017, 55, 2892-2902. 11 pages.
Danko, et al. "Ring-opening polymerization of γ-butyrolactone and its derivatives: A review." Polimery 2017, 62, nr4. 11 pages.

* cited by examiner

*Primary Examiner* — Jeffrey C Mullis
(74) *Attorney, Agent, or Firm* — Amin, Turocy & Watson, LLP

(57) ABSTRACT

Techniques regarding catalyzing one or more ring-opening polymerizations within one or more flow reactors using one or more organometallic bases are provided. For example, one or more embodiments described herein can comprise a method, which can include forming a polymer, via a ring-opening polymerization within a flow reactor, from a cyclic monomer in the presence of an organometallic base and a primary alcohol initiator.

18 Claims, 19 Drawing Sheets

| Entry | Monomer | Base | $DP_{Target}$ | τ (ms) | Conversion (%) | $DP_{NMR}$ | $M_{n,GPC}$ (kDa) | Molecular Weight Distribution (Đ) |
|---|---|---|---|---|---|---|---|---|
| 1 | VL | tBuO-K | 50 | 8.7 | 87 | 45 | 5.5 | 1.13 |
| 2 | | HMDS-K | | 4.1 | 83 | 42 | 4.6 | 1.13 |
| 3[b] | | tBuO-K | 25 | 55 | 90 | 23 | 3.9 | 1.12 |
| 4[c] | | HMDS-K | 25 | 12 | 83 | 21 | 3.3 | 1.14 |
| 5 | CL | tBuO-K | 50 | 24 | 91 | 46 | 7.6 | 1.18 |
| 6 | | HMDS-K | | 12 | 84 | 44 | 6.5 | 1.14 |
| 7[d] | | tBuO-K | 80 | 14 | 91 | 77 | 12 | 1.24 |
| 8[e] | | tBuO-K | 100 | 10 | 86 | 91 | 14 | 1.25 |
| 9 | L-LA | tBuO-K | 50 | 3.8 | 86 | 47 | 8.5 | 1.13 |
| 10 | | HMDS-K | | | 86 | 47 | 8.3 | 1.13 |
| 11[c] | TMC | HMDS-K | 25 | 55 | 92 | 25 | 2.9 | 1.11 |

FIG. 4

| Entry | Reaction Type | DP$_{Target}$ | Reaction Time (s) | Conversion (%) | DP$_{NMR}$ | M$_{n, GPC}$ (kDa) | PDI |
|---|---|---|---|---|---|---|---|
| 1 | Flow | 50 | 0.0087 | 88 | 47 | 8.0 | 1.19 |
| 2 | Batch | 50 | 2 | 90 | 67 | 8.5 | 1.59 |
| 3 | Batch | 50 | 5 | 89 | 61 | 6.0 | 1.81 |
| 4 | Batch | 50 | 15 | 89 | 59 | 6.7 | 1.72 |
| 5 | Batch | 50 | 60 | 90 | 60 | 6.4 | 1.85 |

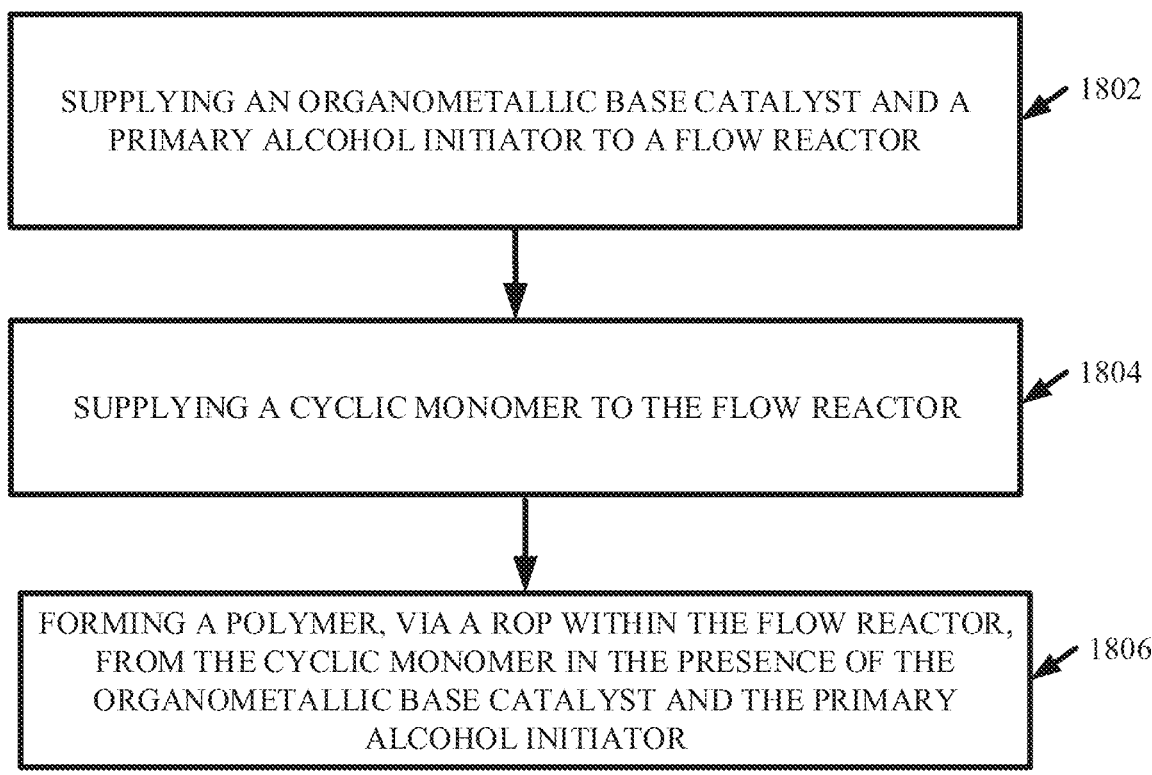

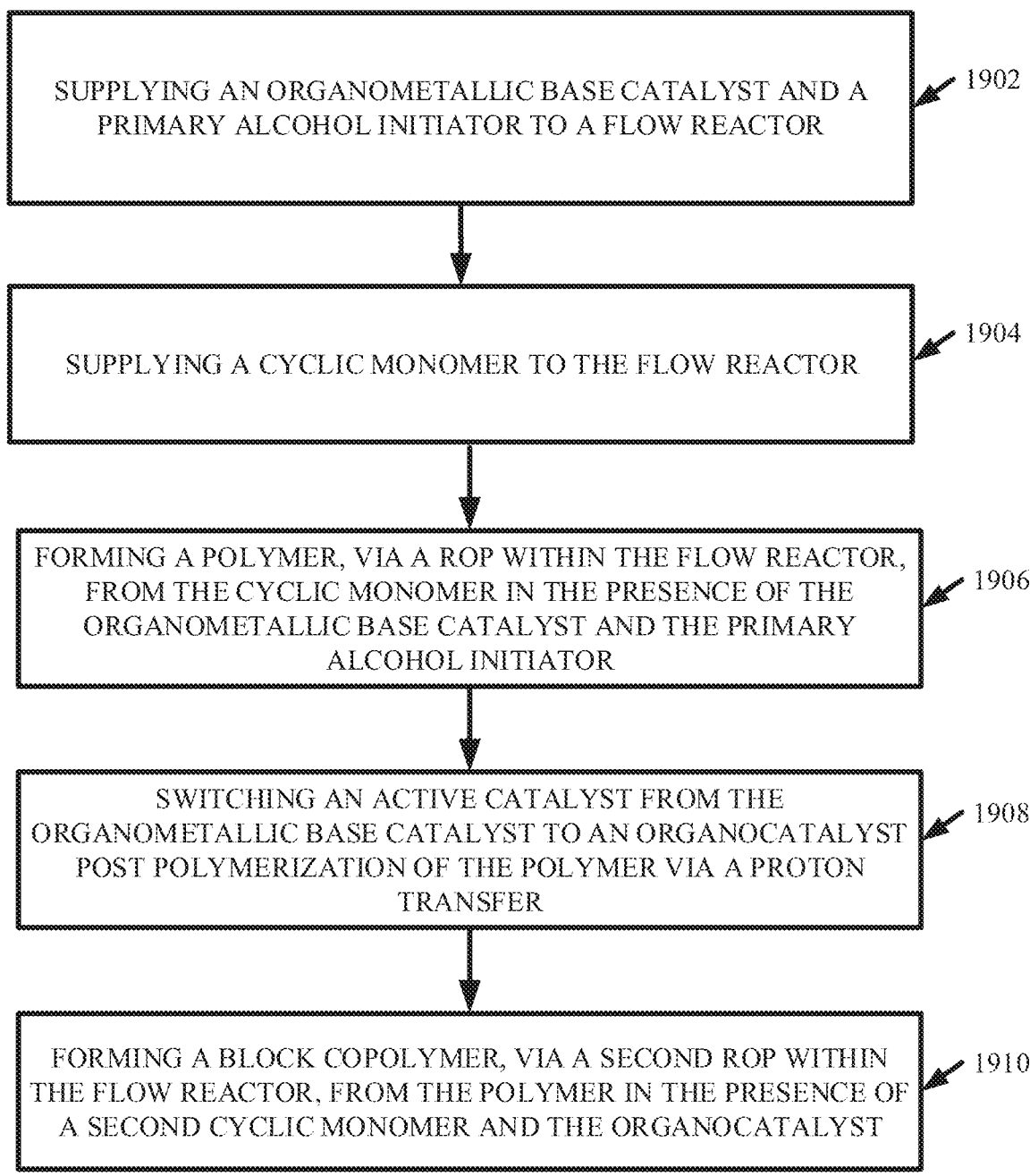

POLYMER TECHNOLOGY FOR USE IN FLOW REACTORS

BACKGROUND

The subject disclosure relates to one or more methods of synthesizing polymers via one or more ring-opening polymerizations ("ROP") in a flow reactor, and more specifically, to the synthesis of polymers and/or block copolymers from cyclic monomers via one or more ROPs in a flow reactor in the presence of an organometallic base catalyst.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, methods regarding the synthesis of one or more polymers using a flow reactor are described.

According to an embodiment, a method is provided. The method can comprise forming a polymer, via a ring-opening polymerization within a flow reactor, from a cyclic monomer in the presence of an organometallic base and a primary alcohol initiator.

According to another embodiment, a method is provided. The method can comprise forming a polymer, via a ring-opening polymerization within a flow reactor, from a cyclic monomer in the presence of an organometallic amide base and primary alcohol initiator.

According to another embodiment, a method is provided. The method can comprise forming a polymer, via a ring-opening polymerization within a flow reactor, from a cyclic monomer in the presence of an organometallic alkoxide base and primary alcohol initiator.

BRIEF DESCRIPTION OF THE DRAWINGS

FIG. 4 illustrates a diagram of an example, non-limiting table that can depict the efficacy of one or more exemplary polymerization schemes comprising one or more ROPs that can be performed within one or more flow reactors in accordance with one or more embodiments described herein.

FIG. 18 illustrates a flow diagram of an example, non-limiting method that can facilitate the synthesis of one or more polymers via one or more ROPs performed in one or more flow reactors in accordance with one or more embodiments described herein.

FIG. 19 illustrates a flow diagram of an example, non-limiting method that can facilitate the synthesis of one or more polymers via one or more ROPs performed in one or more flow reactors in accordance with one or more embodiments described herein.

DETAILED DESCRIPTION

Figure 1:
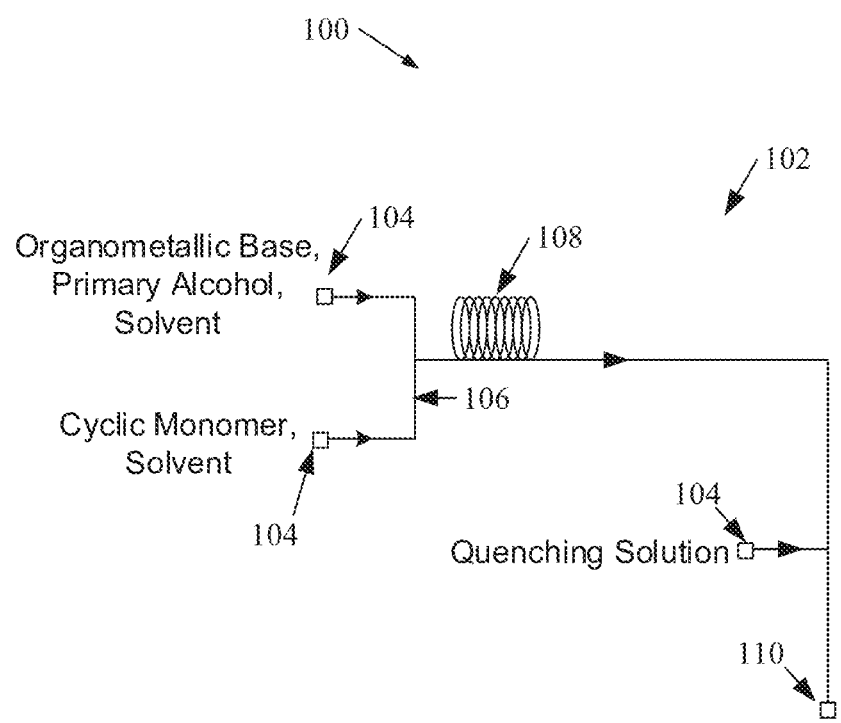
FIG. 1 illustrates a diagram of an example, non-limiting flow reaction scheme that can comprise one or more ROPs within one or more flow reactors in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In a flow system, less reactive monomers require longer reaction times and thus larger reactor volume, especially under high flow rates. For library synthesis, such volume can lead to excess material waste (e.g., especially with less readily available monomers). While urea anions have been demonstrated to be a class of highly competent catalysts for rapid ROP, a significantly faster catalyst would be beneficial in the context of continuous flow reactions for routine large-scale polymer library synthesis that involve less reactive monomers (e.g., such as δ-valerolactone ("VL") and ε-caprolactone ("CL")).

Tert-Butoxide has been applied in the ROP of epoxides, thiolactones, cyclic esters and cyclic carbonates. For example, t-butoxide was proposed to initiate polymerization of cyclic esters either by direct nucleophilic attack, and/or by generating a monomer initiator via deprotonation. However, traditional conditions involve either long reaction times, or uncontrolled reactions due to the t-butoxide's high activity, which has a propensity to induce deleterious side reactions such as epimerization and backbiting that lead to the equilibrium formation of cyclic oligomers. For instance, traditional anionic ROP of cyclic esters with strong soluble bases such as potassium t-butoxide were typically performed in batch and the conditions lead to poor control over the molecular weight and molecular weight distribution of the final polymers due to excess deleterious transesterifications Therefore, the development focus of ROP catalysts for cyclic esters has been shifted towards more selective catalytic systems such as hydrogen-bond based organocatalysts.

Various embodiments described herein can regard one or more ROP performed in flow reactors to synthesize polymers and/or block copolymers, wherein the one or more ROPs can be catalyzed by one or more organometallic bases. One or more embodiments described herein can utilize the rapid mixing and short residence time possible with continuous flow reactions to enable the controlled polymerization of low reactivity monomers (e.g., VL and/or CL) within milliseconds using organometallic alkoxides (e.g., potassium t-butoxide ("tBuO-K")) and/or organometallic amides (e.g., potassium bis(trimethylsilyl)amide ("HMDS-K")). The reactions described herein can show living polymerization behaviors and/or can rapidly generate well defined block copolymers with residence times of less than or equal to 0.1 seconds.

In one or more embodiments, the millisecond residence times exhibited by one or more of the ROPs described herein can facilitate simultaneous initiation and prevent excess deleterious transesterification side reactions by quenching the reaction before very high conversions. For example, various embodiments described herein can use one or more organometallic bases to catalyze polymerizations via the deprotonation of a primary alcohol. The strong basicity of the organometallic bases (e.g., tBuO-K and/or HMDS-K) can favor proton transfer from primary alcohol initiators, and the steric bulk of the bases can enable minimal polymerization initiation directed by the bases. The high activity of the generated alkoxides can lead to the rapid polymerization of low activity monomers (e.g., VL and/or CL) within milliseconds, with control over the molecular weight and molecular weight distribution (Đ) of the final polymers. In one or more embodiments, the activity of organometallic bases (e.g., tBuO-K and/or HMDS-K) for CL polymerization can be two orders of magnitude higher than the fastest urea anion catalyst. Various embodiments described herein can also achieve the near-instant syntheses (e.g., <0.1 seconds (s)) of several well defined block copolymers.

As used herein, the term "flow reactor" can refer to a device in which one or more chemical reactions can take place within one or more channels (e.g., microfluidic channels). For example, a flow reactor can facilitate continuous flow production, as opposed to batch production. One or more streams of chemical reactants can flow (e.g., continuously) through the one or more channels of the flow reactor, wherein one or more chemical reactions (e.g., polymerizations, protonations, and/or deprotonations) involving the chemical reactants can occur within the one or more channels as the one or more streams flow.

Materials can be purchased from Sigma-Aldrich unless otherwise specified. L-Lactide ("L-LA") can be used as received. VL and CL monomers can be dried by storing the monomers with activated molecular sieves. Trimethylene carbonate ("TMC") can be purified by dissolving in dichloromethane, filtering, followed by recrystallizing with diethyl ether. Benzoic acid (e.g., greater than or equal to 99.5%), benzyl alcohol (e.g., anhydrous, 99.8%), 1-pyrenebutanol (e.g., 99%), potassium tert-butoxide, sodium tert-butoxide, lithium tert-butoxide (e.g., 1.0 molar (M) in tetrahydrofuran ("THF")), potassium bis(trimethylsilyl)amide (e.g., 95%), sodium bis(trimethylsilyl)amide (e.g., 5%), and lithium bis(trimethylsilyl)amide (e.g., 97%) can be used as received. THF can be degassed with nitrogen and passed through two columns of alumina under nitrogen in a solvent purification system. One or more urea compounds can be prepared according to literature methods. Materials for one or more flow reactor described herein can include perfluoroalkoxy alkane ("PFA") tubing, connectors, adapters, and T-mixers.

Nuclear magnetic resonance ("NMR") spectra can be collected at 20 degrees Celsius (° C.) on 300/400 megaHertz (MHz) Varian Instruments, with chemical shifts referenced to residual solvent peaks and reported in ppm relative to tetramethylsilane. Polystyrene ("PS") calibrated molecular weights were determined using two PL gel 10 micrometer (μm) mixed-B LS columns in series, with DAWN 8+ multiangle laser light scattering detector and an Optilab T-rEX differential refractometer.

Unless otherwise stated, the reaction solutions were prepared in an $N_2$ filled glovebox and transferred to syringes. The syringes can then be connected to a flow reactor outside of the glovebox. Flow rates per flow reactor inlet can be as high as possible to ensure the most rapid mixing (e.g., at least 40 mL/min for tubing with inner diameters of 0.5 or 1 millimeters (mm)). In various embodiments, T-mixers for combining the catalyst/initiator and monomer solutions can have an inner diameter of 0.5 mm, and/or T-mixers for introducing the benzoic acid solution had an inner diameter of 0.5 or 1 mm. Further, crude samples can be purified by precipitation into methanol and centrifugation, but the time in methanol can be minimized to inhibit transesterification by methanol.

FIG. 1 illustrates a diagram of an example, non-limiting flow reactor scheme 100 that can be utilized to facilitate one or more ROPs in accordance with one or more embodiments described herein. Repetitive description of like elements employed in other embodiments described herein is omitted for sake of brevity. FIG. 1 depicts one or more ROPs that can be utilized to form one or more polymers from one or more cyclic monomers. In various embodiments, the ROPs can be catalyzed by one or more organometallic bases, and/or one or more primary alcohols can serve as an initiator for the one or more ROPs.

As shown in FIG. 1, the flow reactor scheme 100 can facilitate ROP of the one or more cyclic monomers within one or more flow reactors 102 (e.g., via a continuous flow production). Example cyclic monomers that can be utilized in the one or more ROPs described herein can include, but are not limited to: epoxides, episulfides, aziridines, thiolactones, cyclic esters, cyclic amides, cyclosiloxanes, cyclic carbonates, cyclic carbosilanes, cyclic phosphoesters, cyclic carbosiloxanes, cyclic siloxanes, a combination thereof, and/or the like. Catalyst choice can directly affect the control over the one or more ROPs as well as the potential for deleterious transesterification reactions on the molecular backbone of produced polymers (e.g., homopolymers and/or copolymers), causing a broadening of the molecular weight distribution. Additionally, catalyst choice can determine the kinetics of polymerization and hence the residence times in the one or more flow reactors, affecting overall reactor throughput.

The one or more ROPs facilitated by the flow reactor scheme 100 of FIG. 1 can comprise one or more organometallic base catalysts. In one or more embodiments, the one or more organometallic base catalysts can be organometallic alkoxides and/or organometallic amides. Example organometallic base catalysts can include, but are not limited to: t-butoxide ("t-buO"), bis(trimethylsilyl)amide ("HMDS"), diisopropylamide, Verkade base, a combination thereof, and/or the like. Further, the one or more organometallic bases can comprise one or more alkali or alkali earth metals. Example alkali or alkali earth metals that can be comprised within the one or more organometallic bases can include, but are not limited to: potassium ("K"), sodium ("Na"), lithium ("Li"), cesium ("Cs"), a combination thereof, and/or the like. For instance, example embodiments of the one or more organometallic base catalysts can include, but are not limited to: tBuO-K, HMDS-K, sodium t-butoxide ("tBuO-Na"), sodium bis(trimethylsilyl)amide ("NaHMDS"), lithium t-butoxide ("tBuO-Li"), lithium bis(trimethylsilyl)amide ("HMDS-Li"), diisopropyl thiourea, diphenylurea, isopropyl grignard, bisindole, triazabicyclodecene, a combination thereof, and/or the like. Additionally, the one or more ROPs facilitated by the flow reactor scheme 100 of FIG. 1 can comprise one or more primary alcohols, which can serve as one or more initiators for the ROP. Example primary alcohols that can be utilized in the various ROP embodiments described herein can include, but are not limited to: benzyl alcohol, pyrenemethanol, hexanol, ethylene glycol, pentaerythritol, benzene dimethanol mannose, galactose, glucose, biotin, hydroxyl functional oligomers, hydroxyl functional dendrimers or hyperbranched polymers, a combination thereof, and/or the like.

Additionally, the one or more ROPs facilitated by the flow reactor scheme 100 can be performed at room temperature (e.g., at a temperature greater than or equal to 5 degrees Celsius (° C.) and less than or equal to 70° C.). Further, the one or more ROPs facilitated by the flow reactor scheme 100 can be characterized by residence times within the one or more flow reactors 102 ranging from, for example, greater than or equal to 0.1 milliseconds (ms) and less than or equal to 3 seconds (s). Moreover, the one or more ROPs facilitated by the flow reactor scheme 100 can produce products characterized by narrow molecular weight distributions (Đ) ranging from, for example, greater than or equal to 1.05 and less than or equal to 1.3.

The one or more flow reactors 102 can comprise, for example, one or more inlets 104, one or more channels 106, one or more reactor loops 108, and/or one or more outlets 110. The one or more channels 106 can extend from the one or more inlets 104 to the one or more outlets 110. The one or more channels 106 (e.g., microfluidic channels) can comprise, for example: tubes (e.g., microfluidic tubes), pipes, joiners (e.g., T-mixers), a combination thereof, and/or the like. Additionally, the one or more channels 106 can be oriented into one or more reactor loops 108 at one or more stages between the one or more inlets 104 and/or the one or more outlets 110. The one or more reactor loops 108 can influence the length of the one or more flow reactors 102 and thereby the residence time of the one or more ROPs within the one or more flow reactors 102. One of ordinary skill in the art will recognize that the number of loops comprising the reactor loops 108 and/or the dimensions of the loops can vary depending on a desired flow rate, residence time, and/or turbulence. Further, while the reactor loops 108 are depicted in FIG. 1 as characterized by circular shaped structures, the architecture of the reactor loops 108 is not so limited. For example, the one or more reactor loops 108 can be characterized by elliptical and/or polygonal shaped structures.

In one or more embodiments, a catalyst solution comprising the one or more organometallic bases and/or solvents (e.g., tetrahydrofuran ("THF")) can enter the one or more flow reactors 102 via one or more first inlets 104. Additionally, a monomer solution comprising one or more cyclic monomers and/or solvents (e.g., THF). The one or more cyclic monomers can meet and/or mix with the one or more organometallic bases within the one or more channels 106 of the one or more flow reactors 102; thereby forming a stream of chemical reactants. As the stream flows through the one or more flow reactors 102, one or more ROPs can be facilitated by the one or more organometallic catalysts, whereby the one or more cyclic monomers can be polymerized to form one or more polymers (e.g., a homopolymer and/or a copolymer solution).

In one or more embodiments, one or more primary alcohol initiators and/or solvents (e.g., THF) can also be introduced (e.g., via one or more inlets 104) into the one or more flow reactors 102 to facilitate the one or more ROPs. For example, the one or more initiators and/or solvents can be introduced into the one or more flow reactors 102 with the one or more organometallic bases (e.g., as shown in FIG. 1). In another example, the one or more initiators and/or solvents can be introduced into the one or more flow reactors 102 via one or more inlets 104 that are separate from the one or more inlets 104 utilized to introduce the one or more organometallic bases and/or cyclic monomers.

The stream of chemical reactants can undergo one or more ROPs to form a stream of polymers within the one or more channels 106 of the one or more flow reactors 102. Additionally, one or more quenching solutions can be added to the stream of polymers. The one or more quenching solutions can be introduced into the one or more flow reactors 102 via one or more distinct inlets 104. The one or more quenching solutions can quench the ROP within the one or more channels 106 that forms the one or more polymers. The one or more quenching solutions can be characterized by being acidic in nature (e.g., comprising a carboxylate group). Example quenching compounds that can be comprised within the one or more quenching solutions can include, but are not limited to: benzoic acid, acetic acid, trifluoroacetic acid, a combination thereof, and/or the like. In one or more embodiments, a solvent can be introduced (e.g., with the one or more quenching solutions or separately) into the one or more flow reactors 102 via one or more inlets 104 to facilitate the quenching. Example solvents that can be introduced with the one or more organometallic base catalysts, primary alcohol initiators, cyclic monomers, and/or quenching compounds can include, but are not limited to: THF, benzene, toluene, chlorobenzene, dichloromethane methylene chloride, chloroform, dimethylformamide ("DMF"), dimethyl sulfoxide ("DMSO"), toluene, acetonitrile, a combination thereof, and/or the like.

Figure 2:
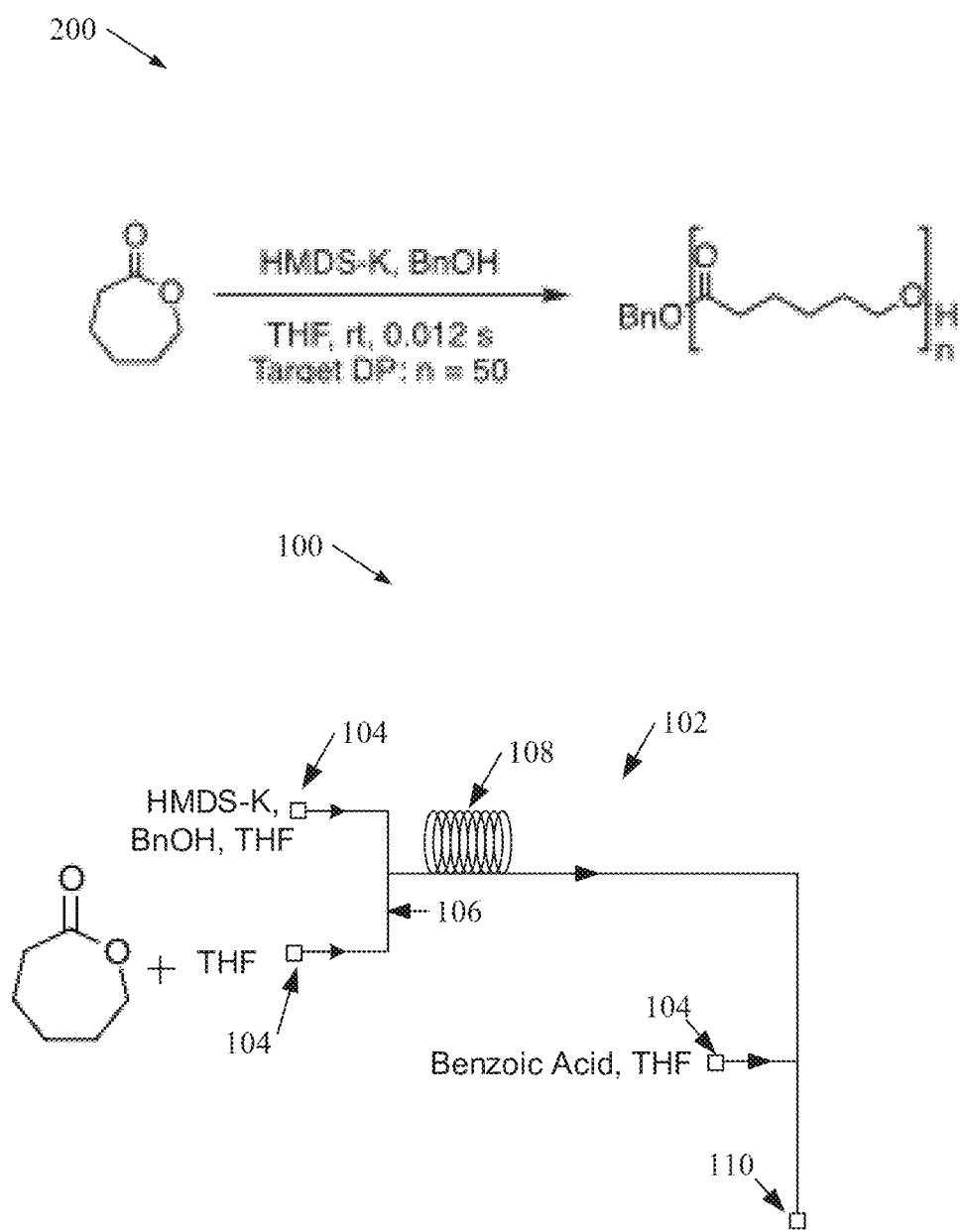
FIG. 2 illustrates a diagram of an example, non-limiting polymerization scheme that can exemplify one or more ROPs that can be performed within one or more flow reactors in accordance with one or more embodiments described herein.

FIG. 2 illustrates a diagram of an example, non-limiting polymerization scheme 200 that can characterize one or more ROPs that can be facilitated by the one or more reactor flow schemes in accordance with one or more embodiments described herein. Repetitive description of like elements employed in other embodiments described herein is omitted for sake of brevity. While one or more particular chemical reactants and/or products are depicted, additional embodiments of the polymerization scheme 200 shown in FIG. 2 are also envisaged. In various embodiments, the polymerization scheme 200 can be facilitated by the flow reactor scheme 100. The exemplary polymerization scheme 200 can comprise a ROP of one or more CL monomers. As shown in FIG. 2, the organometallic base catalyst of polymerization scheme 200 can be HMDS-K, the primary alcohol initiator can be benzyl alcohol ("BnOH"), and the solvent can be THF. Further, the polymerization scheme 200 can be performed at room temperature ("rt"), and/or can exhibit a chemical residence time of 0.012 s.

As shown in FIG. 2, the HMDS-K organometallic base catalyst and/or the BnOH initiator can be supplied to the one or more flow reactors 102 via a first inlet 104. Additionally, the one or more CL cyclic monomers can be supplied to the one or more flow reactors 102 via a second inlet 104. The polymerization scheme 200 can be performed in one or more channels 106 and/or reactor loops 108 of the one or more flow reactors 102. Further, a quenching solution comprising benzoic acid can be supplied to the chemical stream via a third inlet 104 positioned downstream of the reactor loops 108, wherein the quenching solution can quench the ROP within the one or more channels prior to the chemical stream, and thereby the produced polymers, exit the one or more flow reactors 102 via one or more outlets 110.

Figure 3:
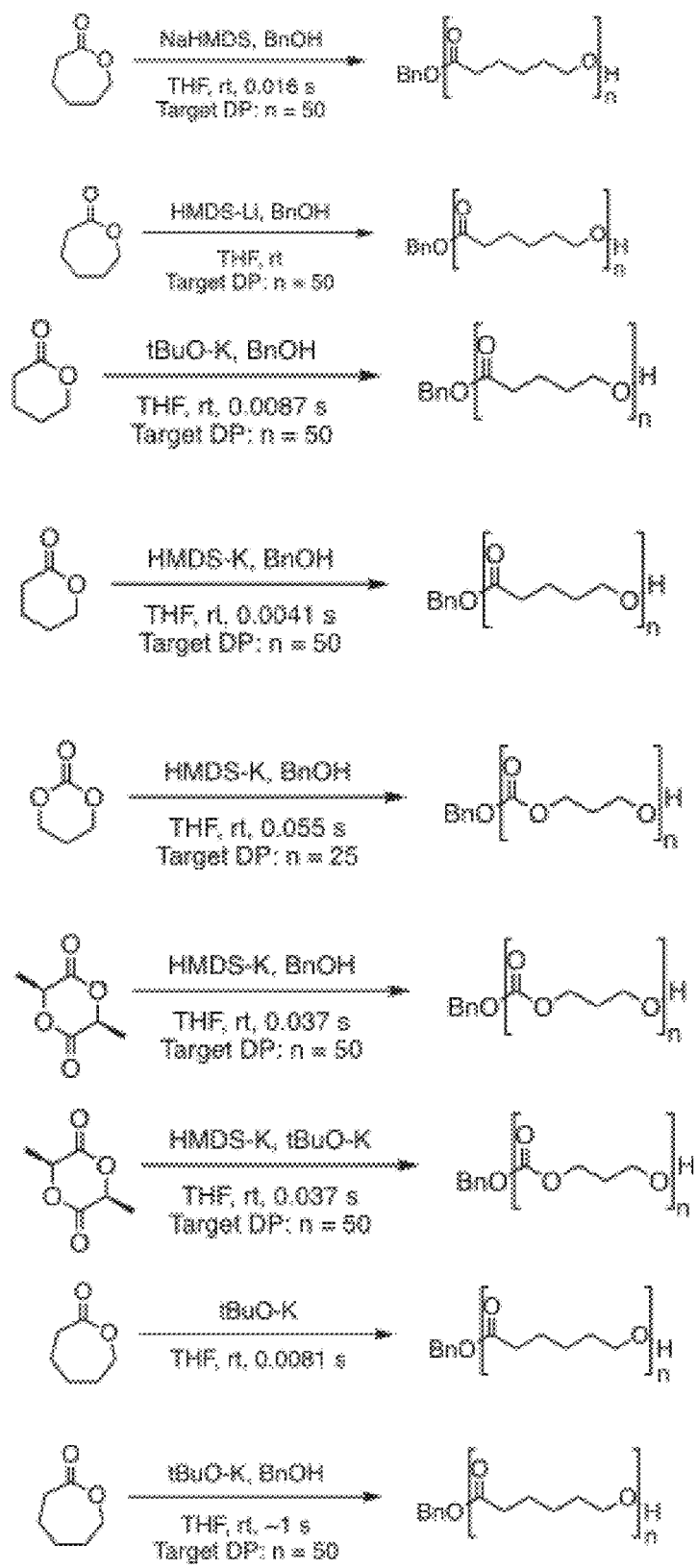
FIG. 3 illustrates a diagram of example, non-limiting polymerization schemes that can exemplify one or more ROPs facilitated by organometallic base catalysts and/or can be performed within one or more flow reactors in accordance with one or more embodiments described herein.

FIG. 3 illustrates a diagram of example, non-limiting polymerization schemes that can be facilitated by the flow reactor scheme 100 in accordance with one or more embodiments described herein. Repetitive description of like elements employed in other embodiments described herein is omitted for sake of brevity. The polymerization schemes depicted in FIG. 3 can further exemplify the variety of ROPs that can be performed in the one or more flow reactors 102 and/or facilitated by the one or more organometallic base catalysts. For example, the exemplary polymerization schemes depict one or more ROPs of VL monomers, CL monomers, trimethylene carbonate ("TMC") monomers, and/or lactide monomers (e.g., L-lactide "L-LA"). Further, the various polymerization schemes depicted in FIG. 3 exemplify the use of HMDS and t-BuO organometallic base catalysts. Additionally, the polymerization schemes depicted in FIG. 3 can be performed in accordance with the flow reactor scheme 100 (e.g., in accordance with the exemplary manner depicted in FIG. 2).

FIG. 4 illustrates a diagram of an example, non-limiting table 400 that can depict the efficacy of the one or more polymerization schemes (e.g., depicted in FIGS. 2 and/or 3) facilitated by the one or more flow reactor schemes 100 in accordance with one or more embodiments described herein. Repetitive description of like elements employed in other embodiments described herein is omitted for sake of brevity. As shown in table 400, "monomer" can indicate the respective cyclic monomer, "base" can indicate the respective organometallic base catalyst, "$DP_{target}$" can indicate the target DP, "τ" can indicate the residence time, "$DP_{NMR}$" can indicate the measured DP by nuclear magnetic resonance ("NMR"), and "$M_{n,\ GPC}$" can indicate molecular weight measured by gel permeation chromatography (e.g., calibrated with polystyrene standards). Unless otherwise specified reaction conditions for the one or more polymerization schemes characterized by table 400 can be: $[base]_0$=0.005 molar (M), $[BnOH]_0$=0.02M and $[monomer]_0$=1 M in THF at room temperature. $[BnOH]_0$=$^b$0.04 M, $^d$0.0125 M and $^e$0.01 M. $^c[monomer]_0$=0.5 M.

As shown in table 400, under continuous flow conditions, the polymerization of VL initiated by BnOH and catalyzed by tBuO-K reached 87% conversion and the expected degree of polymerization (DP) in 8.7 milliseconds (ms) with a narrow molecular weight distribution of the resulting polymer (e.g., table 400, entry 1; Đ=1.13). The same reaction catalyzed by HMDS-K reached 83% conversion in just 4.1 ms (e.g., table 400, entry 2; Đ=1.13). The polymerization of CL also reached high conversions with short residence time and good control (e.g., table 400, entries 3 to 8). Further, tBuO-K and HMDS-K can exhibit activities for the polymerization of CL that are two orders of magnitude higher than the most active urea anion reported. Interestingly, the polymerizations of L-LA and TMC (e.g., monomers that are much more active when polymerized using urea anions; table 400, entries 9 to 11) exhibited slower kinetics than the polymerizations of CL and VL.

The following example polymerization procedure can be conducted in accordance with one or more of the polymerization schemes depicted in FIG. 3 to achieve entry 1 of table 400. In an nitrogen gas ("$N_2$") filled glovebox, a 2 molar (M) solution of VL can be prepared by dissolving 2000 milligrams (mg) of VL (e.g., 20 millimole (mmol)) in 8 milliliters (mL) of THF. A catalyst/initiator stock solution can be prepared by dissolving 22.5 mg tBuO-K (e.g., 0.2 mmol) and 86.4 mg BnOH (e.g., 0.8 mmol) in 19.9 mL THF, wherein 5 mL of each solution can be transferred to two 10 mL syringes respectively. A third syringe containing 5 mL of benzoic acid in THF can also be prepared.

Outside of the glovebox, the syringes containing the monomer solution and catalyst/initiator solutions can be connected to the flow reactor 102 (e.g., via the one or more inlets 104). A syringe pump can be set to a flow rate of 30 milliliters per minute (mL/min) for each inlet 104. The catalyst/initiator and monomer solutions can be combined via a T-mixer (e.g., 0.5 millimeter (mm) inner diameter). The tubing (e.g., PFA, 0.5 mm inner diameter) for polymerization was 5 cm long, corresponding to a residence time of 0.0087 s. A second T-mixer (e.g., 1 mm inner diameter) combined the benzoic acid solution with the reaction mixture to quench the reaction. Conversion was determined by integrating the peaks at 4.33 parts per million (ppm) (monomer) and 4.06 ppm (polymer) (e.g., nuclear magnetic resonance "NMR" in deuterated chloroform "$CDCl_3$"). $DP_{NMR}$ was determined by the integrating the peak at 5.11 ppm (benzyl end group) and the peak at 4.06 ppm (polymer). Proton NMR ("$^1$H NMR") at 400 megaHertz (MHz), $CDCl_3$ resulted in: δ 7.35 (m, 5H), 5.11 (s, 2H), 4.06 (t, 89H), 2.34 (t, 91H), 1.65 (m, 185H).

The following example polymerization procedure can be conducted in accordance with one or more of the polymerization schemes depicted in FIG. 3 to achieve entry 2 of table 400. In an $N_2$ filled glovebox, a 2 M solution of VL was prepared by dissolving 2000 mg of VL (e.g., 20 mmol) in 8 mL of THF. A catalyst/initiator stock solution was prepared by dissolving 39.9 mg of HMDS-K (e.g., 0.2 mmol) and 86.4 mg of BnOH (e.g., 0.8 mmol) in 19.9 mL of THF, wherein 5 mL of each solution was transferred to two 10 mL syringes respectively. A third syringe containing 5 mL of benzoic acid in THF was also prepared.

Outside of the glovebox, the syringes containing the monomer solution and catalyst/initiator solutions were connected to the flow reactor 102. The syringe pump was set to a flow rate of 30 mL/min for each inlet 104. The catalyst/initiator and monomer solutions were combined via a T-mixer (e.g., 0.5 mm inner diameter). The tubing (e.g., PFA, 0.25 mm inner diameter) for polymerization was 4 cm long, corresponding to a residence time of 0.0041 s. A second T-mixer (e.g., 0.5 mm inner diameter) combined the benzoic acid solution with the reaction mixture to quench the reaction. Conversion was determined by integrating the peaks at 4.33 ppm (monomer) and 4.06 ppm (polymer) (NMR in $CDCl_3$). $DP_{NMR}$ was determined by the integrating the peak at 5.11 ppm (benzyl end group) and the peak at 4.06 ppm (polymer). $^1H$ NMR at 400 MHz, $CDCl_3$ resulted in: δ 7.35 (m, 5H), 5.11 (s, 2H), 4.06 (t, 84H), 2.34 (t, 86H), 1.65 (m, 175H).

The following example polymerization procedure can be conducted in accordance with one or more of the polymerization schemes depicted in FIG. 3 to achieve entry 5 of table 400. In an $N_2$ filled glovebox, a 2 M solution of CL was prepared by dissolving 4560 mg of CL (e.g., 40 mmol) in 15.5 mL of THF. A catalyst/initiator stock solution was prepared by dissolving 22.5 mg of tBuO-K (e.g., 0.2 mmol) and 86.4 mg of BnOH (e.g., 0.8 mmol) in 19.9 mL of THF, wherein 5 mL of each solution was transferred to two 10 mL syringes respectively. A third syringe containing 5 mL of benzoic acid in THF was prepared.

Outside of the glovebox, the syringes containing the monomer solution and catalyst/initiator solutions were connected to the flow reactor 102. The syringe pump was set to a flow rate of 35 mL/min for each inlet 104. The catalyst/initiator and monomer solutions were combined via a T-mixer (e.g., 0.5 mm inner diameter). The tubing (e.g., PFA, 0.5 mm inner diameter) for polymerization was 14 cm long, corresponding to a residence time of 0.024 s. A second T-mixer (e.g., 1 mm inner diameter) combined the benzoic acid solution with the reaction mixture to quench the reaction. Conversion was determined by integrating the peaks at 4.22 ppm (monomer) and 4.05 ppm (polymer) (NMR in $CDCl_3$). $DP_{NMR}$ was determined by the integrating the peak at 5.11 ppm (benzyl end group) (or the peak at 3.63 ppm) and the peak at 4.06 ppm (polymer). $k_{obs}$ was determined by plotting $\ln([CL]_0/[CL]_t)$ against time (e.g., in minutes).). $^1H$ NMR at 400 MHz, $CDCl_3$ resulted in: δ 7.35 (m, 5H), 5.11 (s, 2H), 4.05 (t, 92H), 2.31 (t, 93H), 1.65 (m, 192H), 1.37 (m, 95H).

The following example polymerization procedure can be conducted in accordance with one or more of the polymerization schemes depicted in FIG. 3 to achieve entry 6 of table 400. In an $N_2$ filled glovebox, a 2 M solution of CL was prepared by dissolving 4560 mg of CL (e.g., 40 mmol) in 15.5 mL of THF. A catalyst/initiator stock solution was prepared by dissolving 40 mg of HMDS-K (e.g., 0.2 mmol) and 86.4 mg of BnOH (e.g., 0.8 mmol) in 19.9 mL of THF, wherein 5 mL of each solution was transferred to two 10 mL syringes respectively. A third syringe containing 5 mL of benzoic acid in THF was prepared.

Outside of the glovebox, the syringes containing the monomer solution and catalyst/initiator solutions were connected to the flow reactor 102. The syringe pump was set to a flow rate of 37.5 mL/min for each inlet 104. The catalyst/initiator and monomer solutions were combined via a T-mixer (e.g., 0.5 mm inner diameter). The tubing (e.g., PFA, 0.5 mm inner diameter) for polymerization was 4 cm long, corresponding to a residence time of 0.012 s. A second T-mixer (e.g., 1 mm inner diameter) combined the benzoic acid solution with the reaction mixture to quench the reaction. Conversion was determined by integrating the peaks at 4.22 ppm (monomer) and 4.05 ppm (polymer) (NMR in $CDCl_3$). $k_{obs}$ was determined by plotting $\ln([CL]_0/[CL]_t)$ against time (e.g., in minutes). $^1H$ NMR at 400 MHz, $CDCl_3$ resulted in: δ 7.35 (m, 5H), 5.11 (s, 2H), 4.05 (t, 87H), 2.31 (t, 87H), 1.65 (m, 179H), 1.37 (m, 89H).

The following example polymerization procedure can be conducted in accordance with one or more of the polymerization schemes depicted in FIG. 3 to achieve entry 11 of table 400. In an $N_2$ filled glovebox, a 1 M solution of TMC was prepared by dissolving 510 mg of TMC (e.g., 5 mmol) in 4.5 mL THF. A catalyst/initiator stock solution was prepared by dissolving 40 mg of HMDS-K (e.g., 0.2 mmol) and 86.4 mg of BnOH (e.g., 0.8 mmol) in 19.9 mL of THF, wherein 5 mL of each solution was transferred to two 10 mL syringes respectively. A third syringe containing 5 mL of benzoic acid in THF was prepared.

Outside of the glovebox, the syringes containing the monomer solution and catalyst/initiator solutions were connected to the flow reactor 102. The syringe pump was set to a flow rate of 37.5 mL/min for each inlet 104. The catalyst/initiator and monomer solutions were combined via a T-mixer (e.g., 0.5 mm inner diameter). The tubing (e.g., PFA, 1.0 mm inner diameter) for polymerization was 8.5 cm long, corresponding to a residence time of 0.055 s. A second T-mixer (e.g., 1 mm inner diameter) combined the benzoic acid solution with the reaction mixture to quench the reaction. Conversion was determined by integrating the peaks at 2.15 ppm (monomer) and 2.05 ppm (polymer) (NMR in $CDCl_3$). $^1H$ NMR at 400 MHz, $CDCl_3$ resulted in: δ 7.37 (m, 5H), 5.15 (s, 2H), 4.23 (t, 100H), 2.05 (quin, 51H).

The following example polymerization procedure can be conducted in accordance with one or more of the polymerization schemes depicted in FIG. 3 to achieve entry 9 of table 400. In an $N_2$-filled glovebox, a 2 M solution of L-LA was prepared by dissolving 2880 mg of L-LA (e.g., 20 mmol) in 7.12 mL of THF. A catalyst/initiator stock solution was prepared by dissolving 22.5 mg of tBuO-K (e.g., 0.2 mmol) and 86.4 mg of BnOH (e.g., 0.8 mmol) in 19.9 mL of THF, wherein 5 mL of each solution was transferred to two 10 mL syringes respectively. A third syringe containing 5 mL of benzoic acid in THF was prepared.

Outside of the glovebox, the syringes containing the monomer solution and catalyst/initiator solutions were connected to the flow reactor 102. The syringe pump was set to a flow rate of 25 mL/min for each inlet 104. The catalyst/initiator and monomer solutions were combined via a T-mixer (e.g., 0.5 mm inner diameter). The tubing (e.g., PFA, 1.0 mm inner diameter) for polymerization was 15 cm long, corresponding to a residence time of 0.038 s. A second T-mixer (e.g., 1 mm inner diameter) combined the benzoic acid solution with the reaction mixture to quench the reaction. Conversion was determined by integrating the peaks at 5.04 ppm (monomer) and 5.16 ppm (polymer) (NMR in CDCl$_3$). $^1$H NMR at 400 MHz, CDCl$_3$ resulted in: δ 7.37 (m, 5H), 5.16 (t, 95H), 1.58 (quin, 290H).

The following example polymerization procedure can be conducted in accordance with one or more of the polymerization schemes depicted in FIG. 3 to achieve entry 10 of table 400. In an N$_2$-filled glovebox, a 2 M solution of L-LA was prepared by dissolving 2880 mg of L-LA (e.g., 20 mmol) in 7.12 mL of THF. A catalyst/initiator stock solution was prepared by dissolving 40 mg of HMDS-K (e.g., 0.2 mmol) and 86.4 mg of BnOH (e.g., 0.8 mmol) in 19.9 mL of THF, wherein 5 mL of each solution was transferred to two 10 mL syringes respectively. A third syringe containing 5 mL of benzoic acid in THF was prepared.

Outside of the glovebox, the syringes containing the monomer solution and catalyst/initiator solutions were connected to the flow reactor 102. The syringe pump was set to a flow rate of 25 mL/min for each inlet 104. The catalyst/initiator and monomer solutions were combined via a T-mixer (e.g., 0.5 mm inner diameter). The tubing (e.g., PFA, 1.0 mm inner diameter) for polymerization was 15 cm long, corresponding to a residence time of 0.038 s. A second T-mixer (e.g., 1 mm inner diameter) combined the benzoic acid solution with the reaction mixture to quench the reaction. Conversion was determined by integrating the peaks at 5.04 ppm (monomer) and 5.16 ppm (polymer) (NMR in CDCl$_3$). $^1$H NMR at 400 MHz, CDCl$_3$ resulted in: δ 7.37 (m, 5H), 5.16 (t, 95H), 1.58 (quin, 287H).

Figure 5:
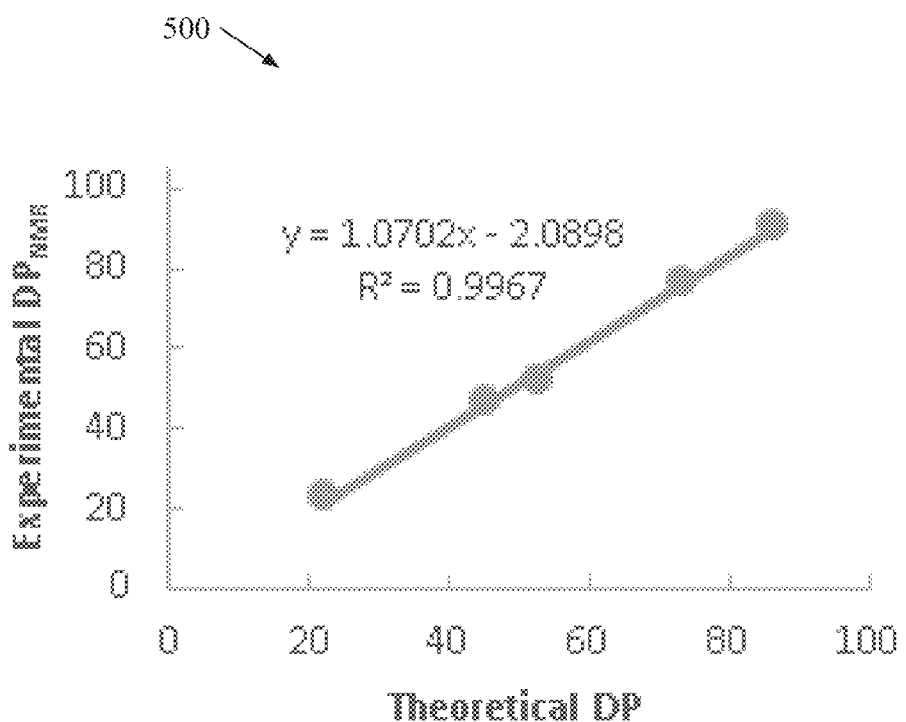
FIG. 5 illustrates a diagram of an example, non-limiting graph that can depict the degree of polymerization that one or more exemplary polymerization schemes can achieve in accordance with one or more embodiments described herein.
Figure 6:
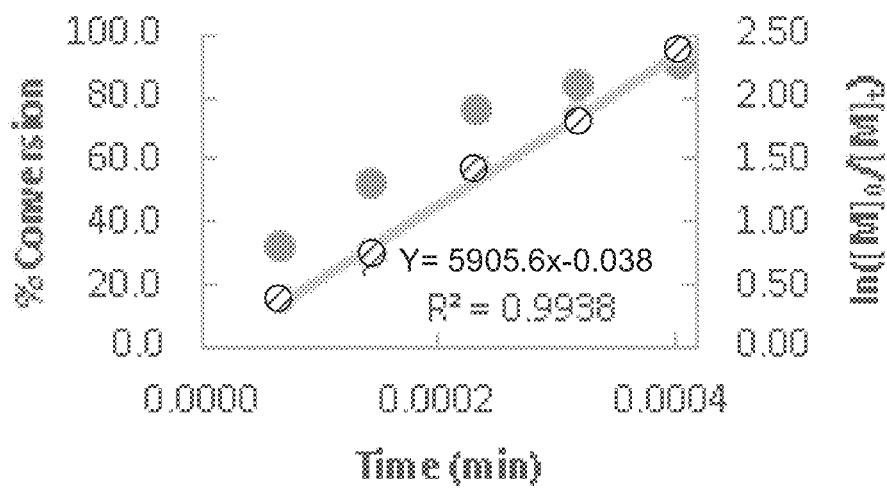
FIG. 6 illustrates a diagram of an example, non-limiting graph that can depict the efficacy of one or more exemplary polymerization schemes comprising one or more ROPs that can be performed within one or more flow reactors in accordance with one or more embodiments described herein.
Figure 6:
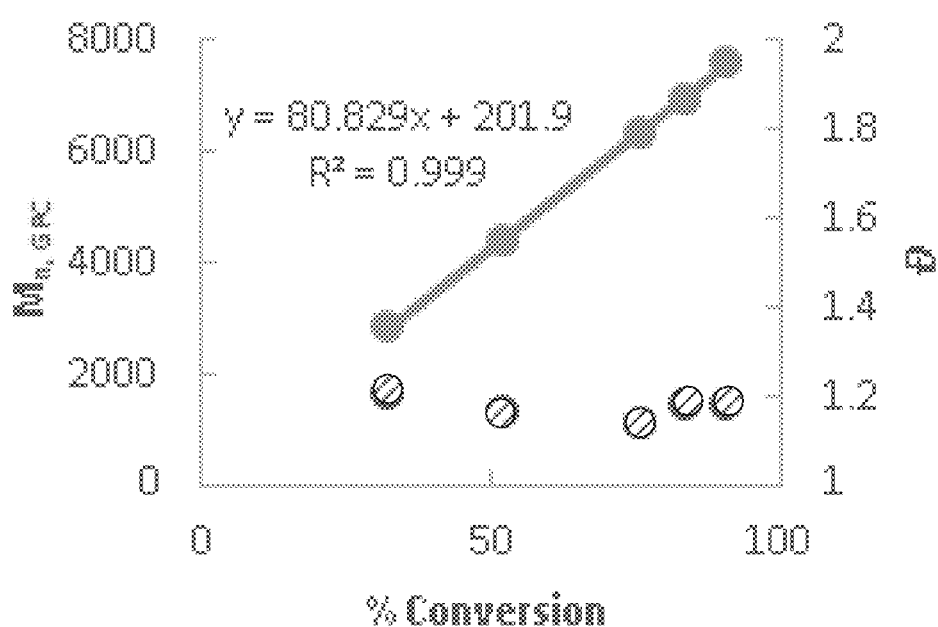

FIGS. 5 and 6 illustrate diagrams of example, non-limiting graphs that can demonstrate the efficacy of one or more ROPs performed in accordance with one or more of the polymerization schemes and/or flow reactor schemes 100 in accordance with one or more embodiments described herein. Repetitive description of like elements employed in other embodiments described herein is omitted for sake of brevity. For example, to further demonstrate the efficacy of the one or more ROPs described herein, graphs 500, 602, and/or 604 can investigate the living behavior of tBuO-K catalyzed ROP in the polymerization of CL.

While tBuO-K itself readily leads to polymerization without an initiator, control over the molecular weight and molecular weight distribution can be achieved when a primary alcohol (e.g., BnOH) is added. Since tBuOH has a higher pK$_a$ than BnOH (e.g., pK$_{a,\ tBuOH}$>pK$_{a,\ EtOH}$>pK$_{a,\ BnOH}$), the predominant form of anion in the reaction mixture can be BnO$^-$. Moreover, the higher steric bulk of tBuOH than primary alcohols renders tBuOH a much less effective nucleophile. With the combined pK$_a$ and steric effects, it can be expected that the extent of direct initiation from tBuO-K can be minimal. Indeed, for polymerizations with a primary alcohol initiator BnOH, As shown in graph 500, $^1$H NMR indicates that the DP values of the purified polymers determined by end group analysis (e.g., BnOH as the end group) match well with the theoretical DP values. As shown in graph 602, CL ROP with tBuO-K can exhibit linear first order monomer decay. Further, as shown in graph 604, CL ROP with tBuO-K can exhibit linear increase of molecular weight with conversion and relatively narrow molecular weight distribution up to high conversions.

Figure 7:
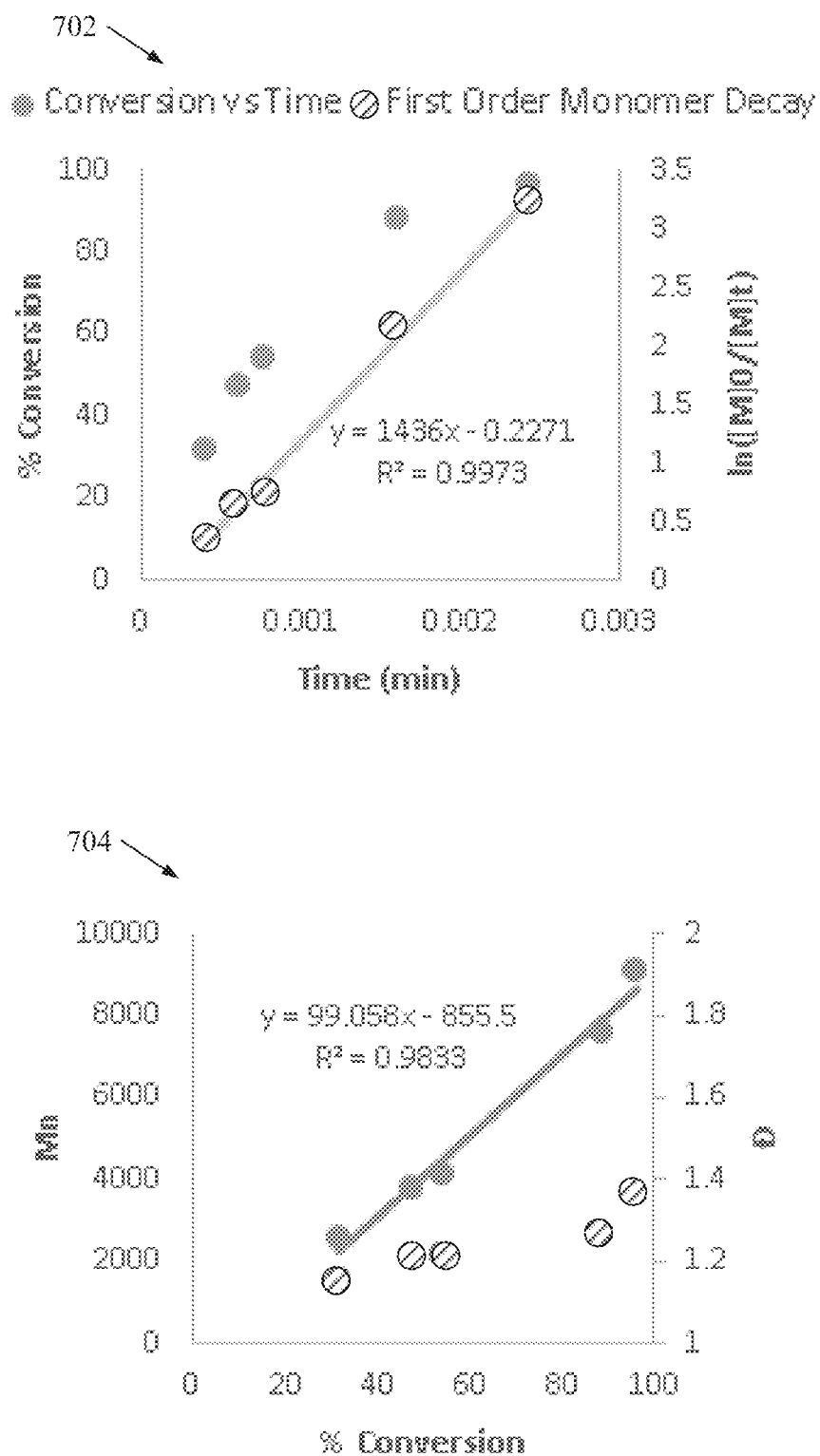
FIG. 7 illustrates a diagram of an example, non-limiting graph that can depict the efficacy of one or more exemplary polymerization schemes comprising one or more ROPs that can be performed within one or more flow reactors in accordance with one or more embodiments described herein.

FIG. 7 illustrates a diagrams of example, non-limiting graphs that can further demonstrate the efficacy of one or more ROPs performed in accordance with one or more of the polymerization schemes and/or flow reactor schemes 100 in accordance with one or more embodiments described herein. Repetitive description of like elements employed in other embodiments described herein is omitted for sake of brevity. For example, graph 700 and/or graph 702 can regard NaHMDS catalyzed CL ROP. For instance, FIG. 7 demonstrates that HMDS catalysts can exhibit similar living polymerization behaviors as tBuO catalysts. As shown in graph 702, CL ROP with NaHMDS can exhibit linear first order monomer decay. Further, as shown in graph 704, CL ROP with NaHMDS can exhibit linear increase of molecular weight with conversion and relatively narrow molecular weight distribution up to high conversions.

The following example polymerization procedure can be conducted in accordance with one or more of the polymerization schemes depicted in FIG. 3 to achieve the results depicted in FIG. 7. In an N$_2$ filled glovebox, a 2 M solution of CL was prepared by dissolving 4560 mg of CL (e.g., 40 mmol) in 15.5 mL of THF. A catalyst/initiator stock solution was prepared by dissolving 37 mg of NaHMDS (e.g., 0.2 mmol) and 86.4 mg of BnOH (e.g., 0.8 mmol) in 19.9 mL of THF, wherein 5 mL of each solution was transferred to two 10 mL syringes respectively. A third syringe containing 5 mL of benzoic acid in THF was prepared.

Outside of the glovebox, the syringes containing the monomer solution and catalyst/initiator solutions were connected to the flow reactor 102. The syringe pump was set to a flow rate of 37.5 mL/min for each inlet 104. The catalyst/initiator and monomer solutions were combined via a T-mixer (e.g., 0.5 mm inner diameter). The tubing (e.g., PFA, 0.5 mm inner diameter) for polymerization was 10 cm long, corresponding to a residence time of 0.016 s. A second T-mixer (e.g., 1 mm inner diameter) combined the benzoic acid solution with the reaction mixture to quench the reaction. Conversion was determined by integrating the peaks at 4.22 ppm (monomer) and 4.05 ppm (polymer) (NMR in CDCl$_3$), wherein k$_{obs}$ was determined by plotting ln([CL]$_0$/[CL]$_t$) against time (in minutes).

Figure 8:
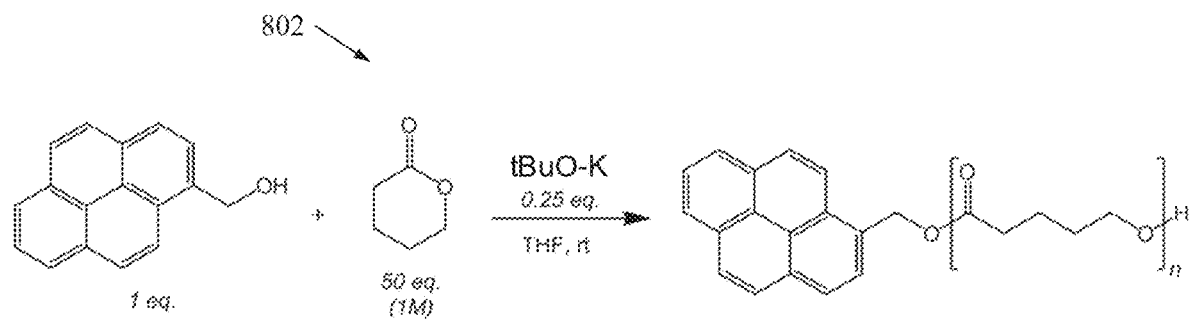
FIG. 8 illustrates a diagram of an example, non-limiting polymerization scheme that can be performed in one or more flow reactors in accordance with one or more embodiments described herein.

FIG. 8 illustrates a diagram of an example, non-limiting polymerization scheme 802 that can comprise one or more ROPs that can be facilitated by the flow reactor scheme 100 in accordance with one or more embodiments described herein. Repetitive description of like elements employed in other embodiments described herein is omitted for sake of brevity. Example polymerization scheme 802 regards a ROP of VL monomers using tBuO-K.

Polymerization scheme 802 exemplifies that a variety of primary alcohols described herein can be utilized as an initiator in the flow reactor scheme 100 and/or exemplary polymerization schemes. For instance, polymerization scheme 802 utilizes pyrenemethanol as the initiator. As presented herein, "n" can be an integer greater than or equal to 1 and less than or equal to 1,000. Also, "m" can be an integer greater than or equal to 1 and less than or equal to 1,000.

Further, FIG. 8 depicts table 804, which can characterize embodiments of polymerization scheme 802 performed in a continuous flow reaction (e.g., via flow reactor scheme 100) and in a batch reaction. Table 804 exemplifies numerous advantages and/or unexpected results that can be achieved by performing the polymerizations described herein within one or more flow reactors 102, such as flow reactor scheme 100.

Figure 9:
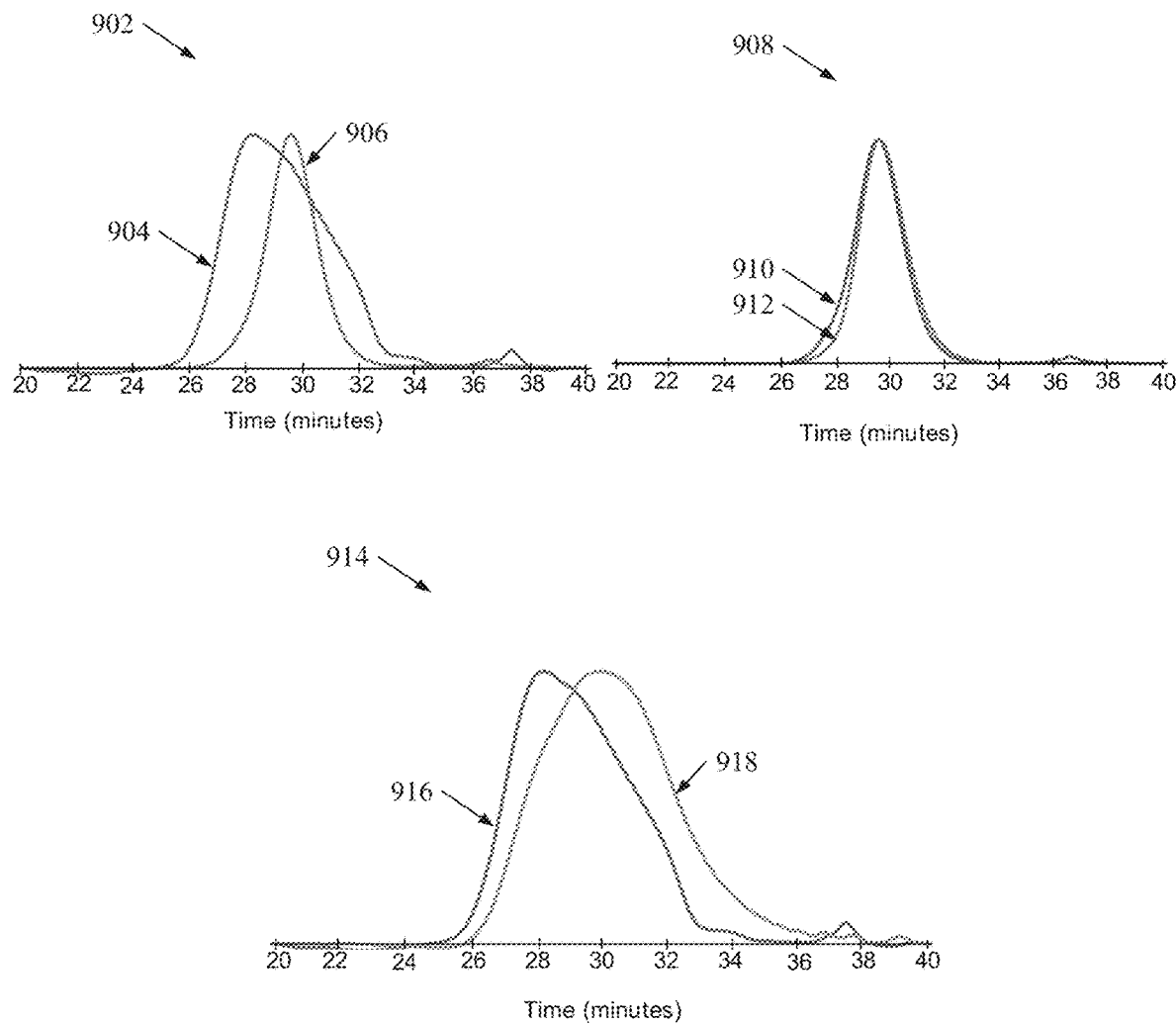
FIG. 9 illustrates a diagram of example, non-limiting graphs that can depict the efficacy of one or more exemplary polymerization schemes comprising one or more ROPs that can be performed within one or more flow reactors in accordance with one or more embodiments described herein.

FIG. 9 illustrates a diagram of example, non-limiting graphs that can demonstrate one or more differences between performing polymerization scheme 802 in a flow reaction (e.g., via flow reactor scheme 100) versus a batch reaction in accordance with one or more embodiments described herein. Repetitive description of like elements employed in other embodiments described herein is omitted for sake of brevity. While the properties characterized in FIG. 9 are described with regards to example polymerization scheme 802; one of ordinary skill in the art will recognize that the depicted properties can also be characteristic of any of the polymerizations described herein.

Graph 902 can regard the molecular weight distribution achieved by polymerization scheme 802 as facilitated by the flow reactor scheme 100 versus a batch reaction process. Line 904 represents the molecular weight distribution achieved by entry 2 of table 804. Line 906 represents the molecular weight distribution achieved by entry 1 of table 804. Graph 902 exemplifies that performance of polymerization scheme 802 within the flow reactor scheme 100 can result in narrower molecular weight distribution than can be achieved by traditional processes (e.g., batch reactions).

Graph 908 can regard the end group fidelity achieved by polymerization scheme 802 as facilitated by the flow reactor scheme 100. Line 910 represents the end group fidelity achieved by entry 1 of table 804, as determined by a refractive index detector. Line 912 represents the end group fidelity achieved by entry 1 of table 804, as determined by an ultraviolet light detector at 260 nanometers. Graph 908 exemplifies that end group fidelity can be maintained via performance of polymerization scheme 802 within the flow reactor scheme 100.

In contrast, graph 914 can regard the end group fidelity achieved by polymerization scheme 802 as performed in a batch reaction process. Line 916 represents the end group fidelity achieved by entry 2 of table 804, as determined by a refractive index detector. Line 918 represents the end group fidelity achieved by entry 2 of table 804, as determined by an ultraviolet light detector at 260 nanometers. Graph 914 exemplifies that end group fidelity can be scrambled via performance of polymerization scheme 802 within a batch reaction process.

Figure 10:
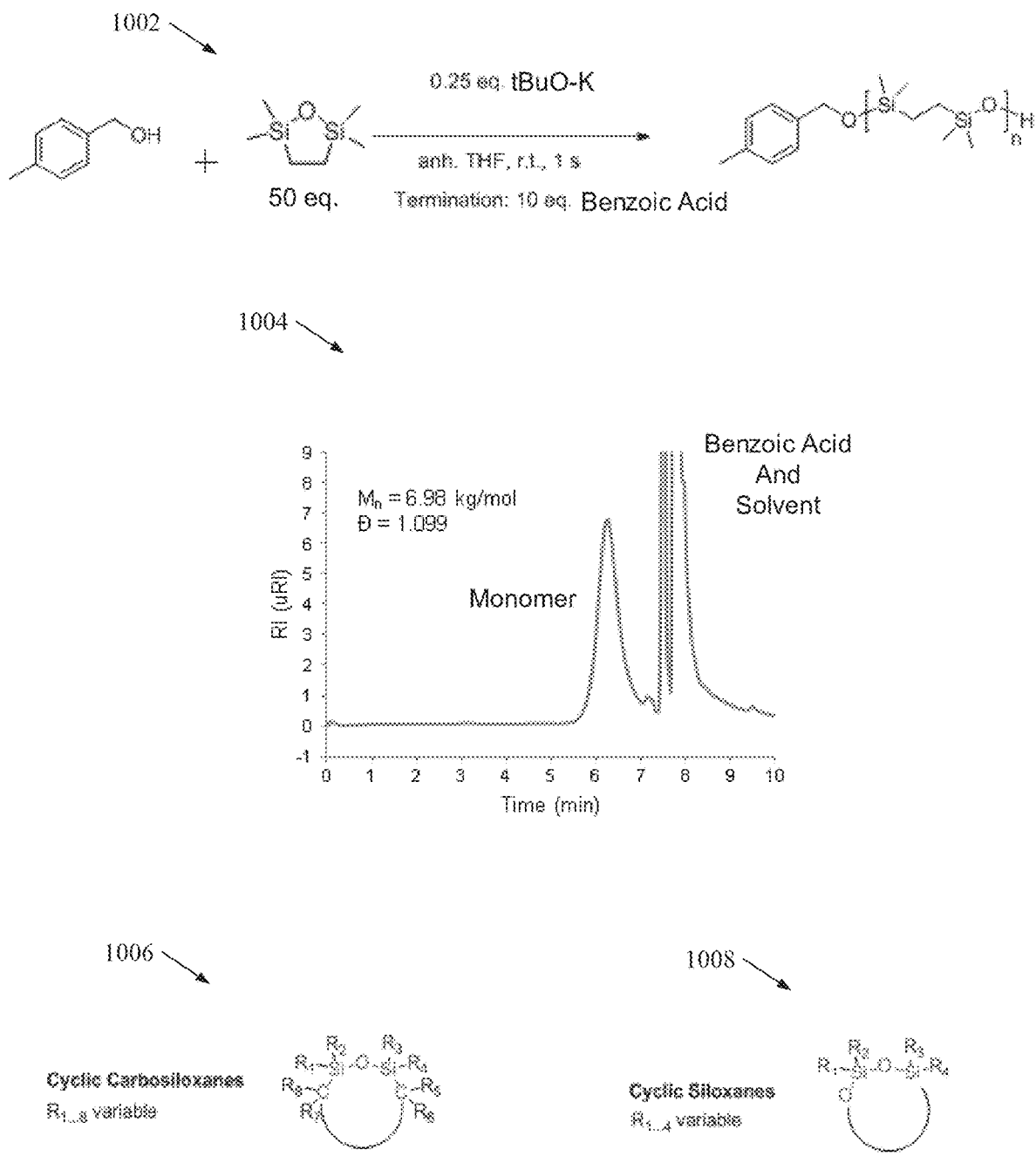
FIG. 10 illustrates a diagram of an example, non-limiting polymerization scheme that can be performed in one or more flow reactors in accordance with one or more embodiments described herein.

FIG. 10 illustrates a diagram of example, non-limiting polymerization scheme 1002 that can comprise one or more ROPs that can be facilitated by the flow reactor scheme 100 in accordance with one or more embodiments described herein. Repetitive description of like elements employed in other embodiments described herein is omitted for sake of brevity. Example polymerization scheme 1002 regards the ROP of 2,2,5,5-tetramethyl-1,2,5-oxadisilolane monomers using tBuO-K as the organometallic catalyst and 4-methylbenzyl alcohol as the initiator. As shown in FIG. 10, "n" can be an integer greater than or equal to 1 and less than or equal to 1,000.

In various embodiments, example polymerization scheme 1002 can be facilitated by the flow reactor scheme 100. For example, graph 1004 depicts the $M_n$ and Đ achieved by polymerization scheme 1002 facilitated by flow reactor scheme 100. Additionally, FIG. 10 illustrates example chemical structure 1006 that can characterize one or more cyclic carbosiloxane monomers that can be utilized the various embodiments described herein. Further, FIG. 10 illustrates example chemical structure 1008 that can characterize one or more cyclic siloxane monomers that can be utilized in the various embodiments described herein. As shown in FIG. 10, "$R_1$", "$R_2$", "$R_3$", "$R_4$", "$R_5$", "$R_6$", and/or "$R_7$" can represent respective functional groups. In various embodiments, the respective functional groups can be the same or different from each other. In one or more embodiments, the respective functional groups can be alkyl or aryl groups.

Figure 11:
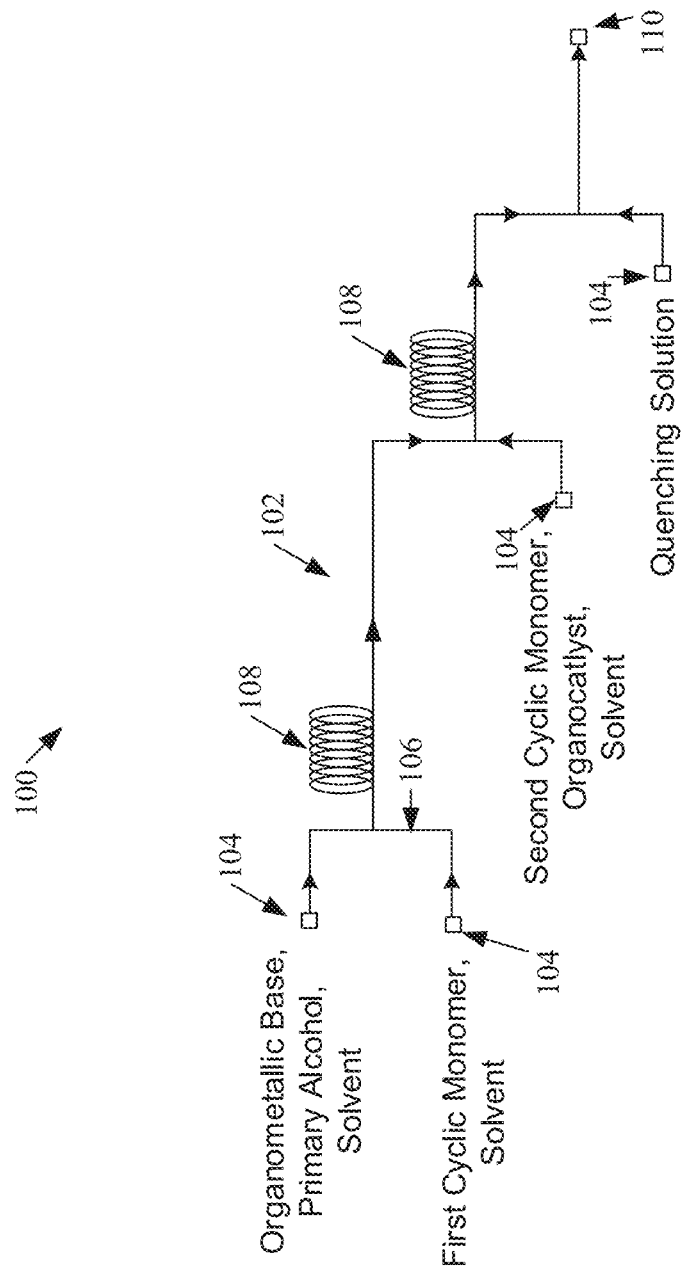
FIG. 11 illustrates a diagram of an example, non-limiting flow reaction scheme that can comprise one or more ROPs within one or more flow reactors in accordance with one or more embodiments described herein.

FIG. 11 illustrates a diagram of the example, non-limiting flow reactor scheme 100 further comprising one or more additional inlets 104 and/or reactor 108 to facilitate synthesizing one or more block copolymers in accordance with one or more embodiments described herein. Repetitive description of like elements employed in other embodiments described herein is omitted for sake of brevity. As shown in FIG. 11, the flow reactor scheme 100 can further facilitate multiple ROPs to form one or more block copolymers.

For example, a first set of reactor loops 108 can facilitate a first ROP of a first cyclic monomer utilizing one or more organometallic base catalysts and/or primary alcohol initiators in accordance with one or more embodiments described herein. The first ROP can form a first block of a desired copolymer. The chemical stream (e.g., comprising the first block polymer) can flow downstream of the first set of reactor loops 108 and further mix within one or more second cyclic monomers and/or an organocatalyst. For example, the one or more second cyclic monomers and/or organocatalyst can enter the flow reactor 102 via a third inlet. In one or more embodiments, the one or more second cyclic monomers and/or organocatalysts can be introduced with a solvent (e.g., THF). Example second cyclic monomers can include, but are not limited to: epoxides, episulfides, aziridines, thiolactones, cyclic esters, cyclic amides, cyclosiloxanes, cyclic carbonates, cyclic carbosilanes, cyclic phosphoesters, cyclic carbosiloxanes, cyclic siloxanes, a combination thereof, and/or the like. Example organocatalysts can include, but are not limited to: urea compounds, thiourea compounds, imidazolium compounds, a combination thereof, and/or the like.

In various embodiments, the one or more organocatalysts undergo a proton transfer in the chemical stream within the one or more channels 106 of the flow reactor. The proton transfer can ionize the organocatalyst; thereby rendering the organocatalyst the active catalyst in the flow reactor. Thereupon, the flow reactor can facilitate a second ROP in which the second cyclic monomer reacts with the polymer formed from the first ROP to form a block copolymer. For example, the second ROP can be performed within the channels 106 and/or second set of reactor loops 108 of the flow reactor 102 and/or can be catalyzed by the ionized organocatalyst. Downstream of the second set of reactor loops 108, the quenching solution can be introduced into the flow reactor via one or more fourth inlets 104 to quench the second ROP. Thus, in various embodiments, a catalyst switch can be performed in the one or more flow reactors 102 to facilitate synthesis of the one or more block copolymers.

A catalyst switch can be used so that the active catalysts' reactivities are matched to the monomers' reactivities. The strong basicity of the organometallic bases can enable a rapid catalyst switch to urea anions. While several example block copolymers can be prepared directly with the organometallic base catalysts (e.g., tBuO-K or HMDS-K), block copolymers can also be initially prepared with a catalyst switch, as the first and second cyclic monomers can have markedly different reactivity profiles (e.g., as observed with polymerizations catalyzed by urea anions). The active catalyst can switch from the organometallic base to the organocatalyst anion via a fast proton transfer when the neutral organocatalyst is co-introduced to the reaction mixture. Homonuclear decoupled $^1$H NMR can confirm the lack of epimerization of the second cyclic monomers, supporting that the proton transfer can occur on a much shorter timescale than epimerization.

Figure 12:
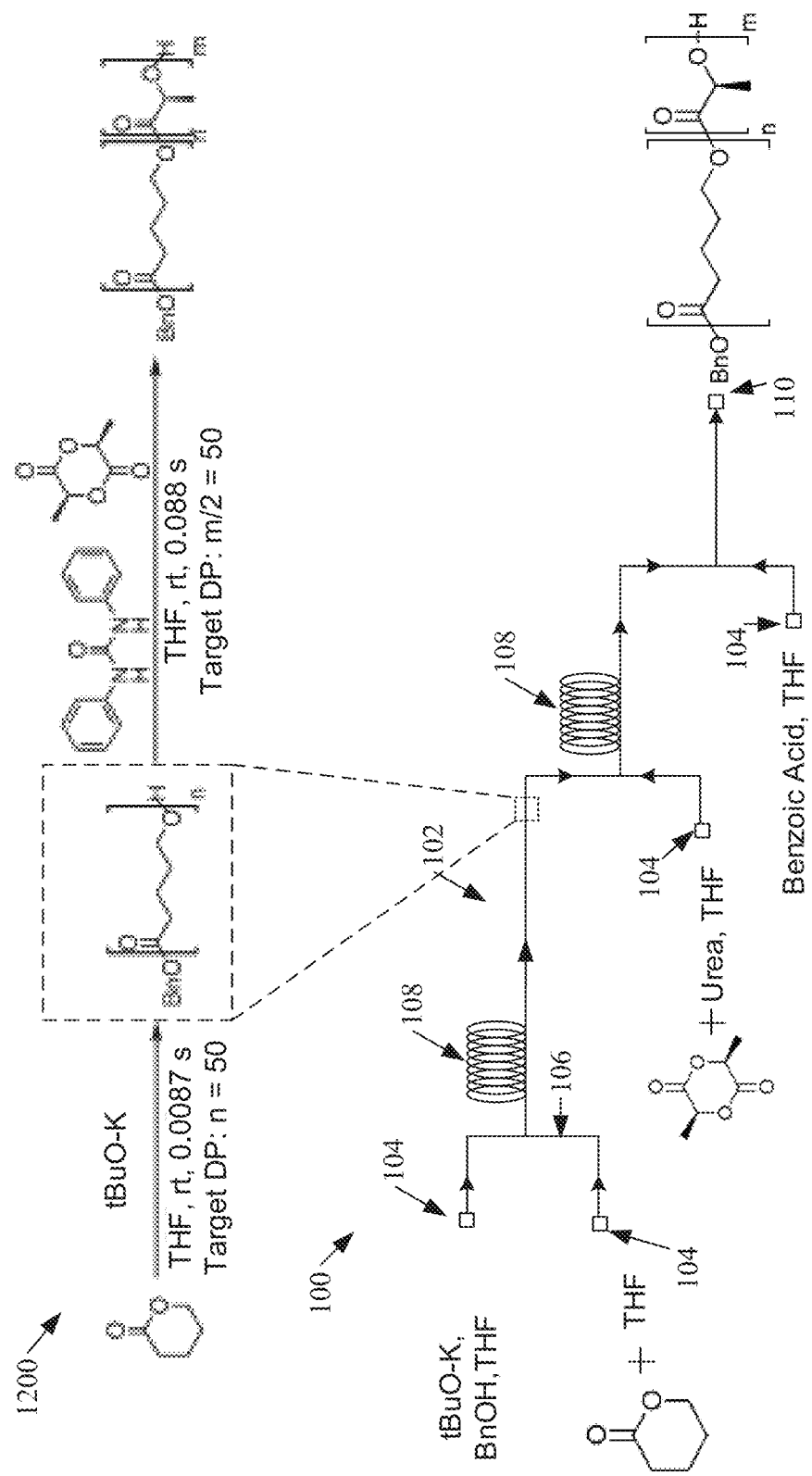
FIG. 12 illustrates a diagram of an example, non-limiting polymerization scheme that can exemplify one or more ROPs that can be performed within one or more flow reactors in accordance with one or more embodiments described herein.

FIG. 12 illustrates a diagram of an example, non-limiting copolymer polymerization scheme 1200 that can characterize a multiple ROP synthesis that can be facilitated by the one or more reactor flow schemes in accordance with one or more embodiments described herein. Repetitive description of like elements employed in other embodiments described herein is omitted for sake of brevity. While one or more particular chemical reactants and/or products are depicted, additional embodiments of the copolymer polymerization scheme 1200 shown in FIG. 12 are also envisaged. In various embodiments, the copolymer polymerization scheme 1200 can be facilitated by the flow reactor scheme 100. The exemplary copolymer polymerization scheme 1200 can comprise a first ROP of one or more VL monomers and a second ROP of one or more L-LA monomers. As shown in FIG. 12, the organometallic base catalyst of copolymer polymerization scheme 1200 can be tBuO-K, the primary alcohol initiator can be BnOH, and the solvent can be THF. Further, the copolymer polymerization scheme 1200 can be performed at room temperature ("rt"), the first ROP can exhibit a chemical residence time of 0.0087 s, the second ROP can exhibit a chemical residence time of 0.088 s, and the organocatalyst can be a urea compound.

As shown in FIG. 12, a mixture of the VL monomers with tBuO-K and BnOH can facilitate a first ROP in a first set of reactor loops 108. Further, a solution of the L-LA monomers and urea organocatalyst can be introduced to the chemical mixture downstream of the first set of reactor loops 108. Upon mixing with the urea organocatalyst, a proton transfer can facilitate an active catalyst switch from the tBuO-K to the urea organocatalyst. Further, the active urea organocatalyst (e.g., ionized urea compound) can facilitate a second ROP in the second set of reactor loops 108 between the L-LA monomers and the polymer product of the first ROP. Additionally, a quenching solution comprising benzoic acid can be introduced to the chemical mixture downstream of the second set of reactor loops 108. The quenching solution can quench the second ROP before the resulting block copolymer exists the flow reactor 102 via the one or more outlets 110.

Figure 13:
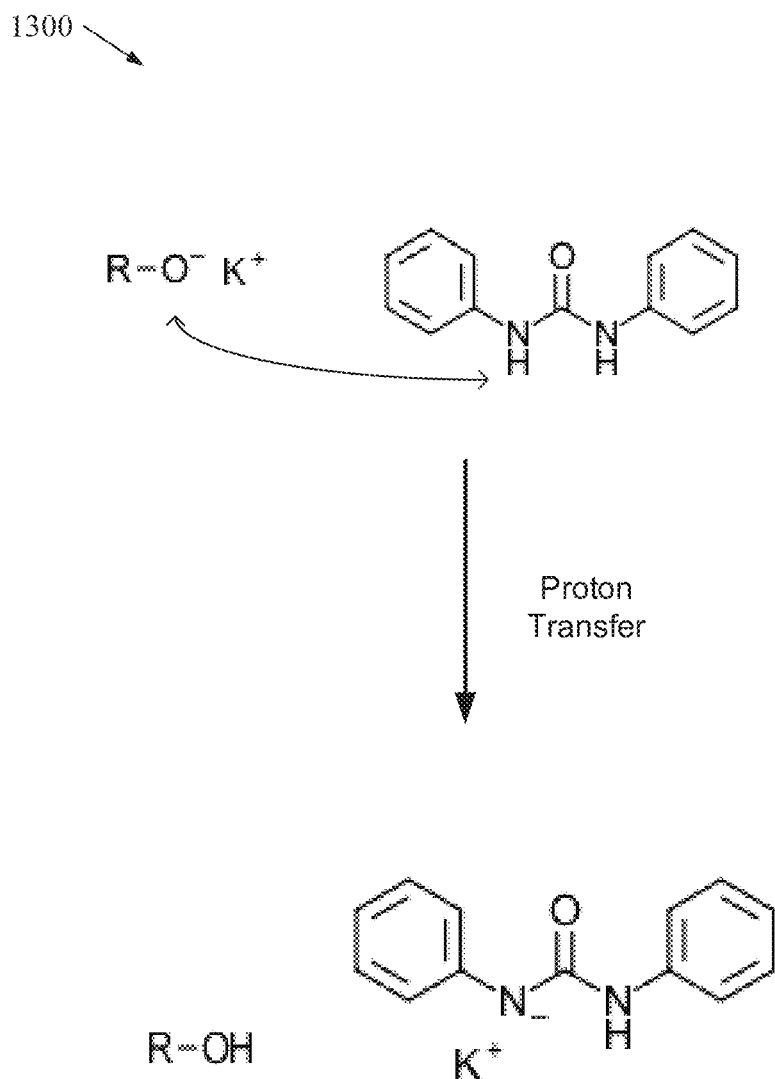
FIG. 13 illustrates a diagram of an example, non-limiting proton transfer scheme that can characterize one or more active catalyst switches that can be performed with one or more ROPs in one or more flow reactors in accordance with one or more embodiments described herein.

FIG. 13 illustrates a diagram of an example, non-limiting proton transfer scheme 1300 that can facilitate a catalyst switch between ROPs in a flow reactor in accordance with one or more embodiments described herein. Repetitive description of like elements employed in other embodiments described herein is omitted for sake of brevity. While one or more particular chemical reactants and/or products are depicted, additional embodiments of the proton transfer scheme 1300 shown in FIG. 13 are also envisaged. In various embodiments, the primary alcohol of the one or more polymerization schemes described herein can be deprotonated during the ROP. For example, the deprotonated primary alcohol can be represented in FIG. 13 by R—O$^-$, wherein "R" can represent a molecular backbone of the primary alcohol (e.g., a benzyl group). When a neutral organocatalyst (e.g., a urea compound) is introduced to the deprotonated primary alcohol, a proton transfer can occur, wherein a proton can transfer from the urea group to re-protonate the initiator. As a result of the proton transfer, the neutral organocatalyst can be rendered anionic and can catalyze one or more ROPs in accordance with one or more embodiments described herein.

Figure 14:
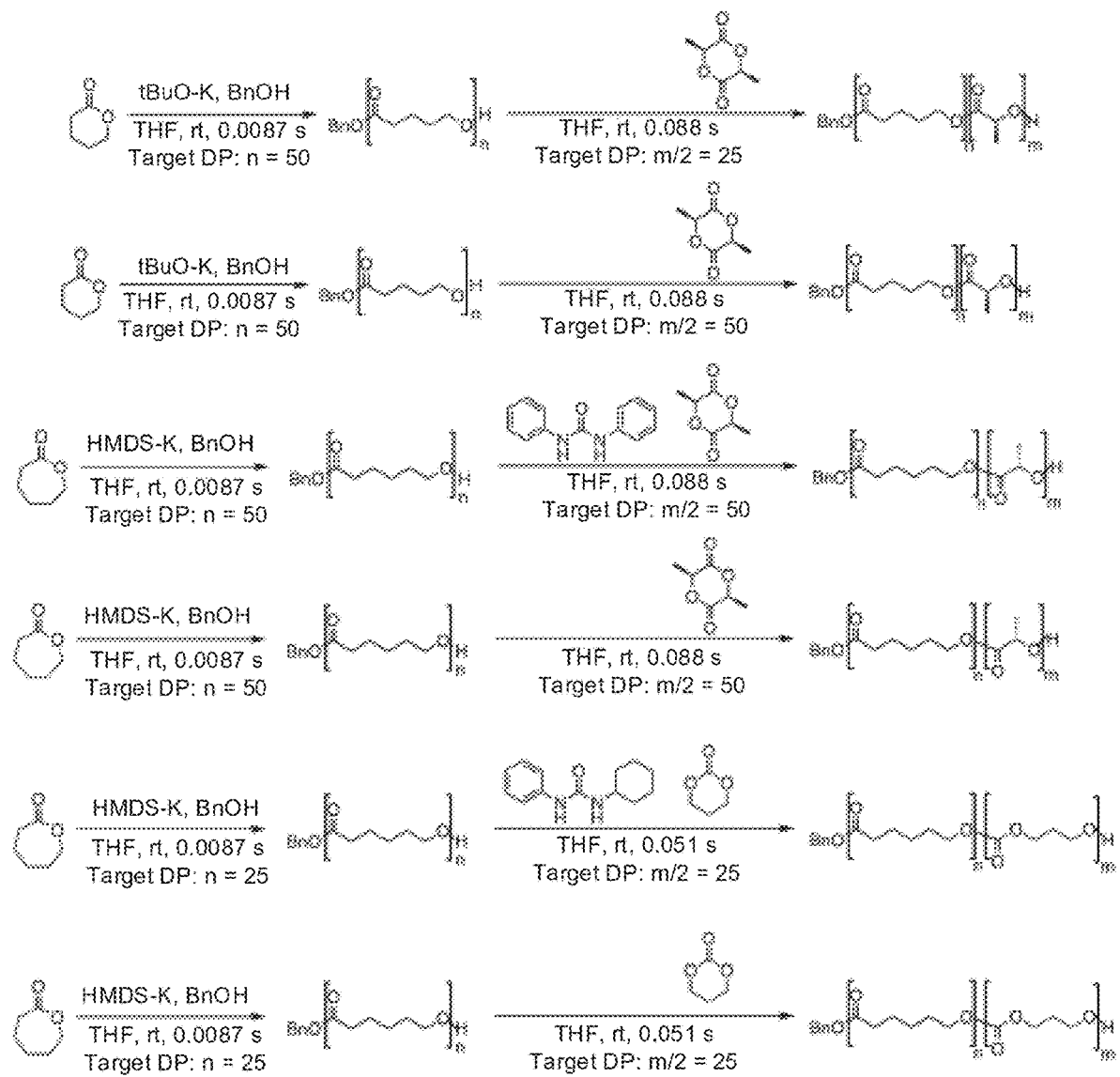
FIG. 14 illustrates a diagram of example, non-limiting polymerization schemes that can exemplify one or more ROPs facilitated by organometallic base catalysts and/or can be performed within one or more flow reactors in accordance with one or more embodiments described herein.

FIG. 14 illustrates a diagram of example, non-limiting copolymer polymerization schemes that can be facilitated by the flow reactor scheme 100 in accordance with one or more embodiments described herein. Repetitive description of like elements employed in other embodiments described herein is omitted for sake of brevity. The copolymer polymerization schemes depicted in FIG. 14 can further exemplify the variety of ROPs that can be performed in the one or more flow reactors 102 and/or facilitated by the one or more organometallic base catalysts. For example, the exemplary copolymer polymerization schemes depict one or more ROPs of VL monomers, CL monomers, TMC monomers, and/or L-LA monomers. Further, the various copolymer polymerization schemes depicted in FIG. 14 exemplify the use of HMDS and t-BuO organometallic base catalysts. Additionally, the polymerization schemes depicted in FIG. 14 can be performed in accordance with the flow reactor scheme 100 (e.g., in accordance with the exemplary manner depicted in FIG. 12). As shown in FIG. 14, in one or more embodiments the copolymerization schemes can comprise multiple ROPs catalyzed by the same organometallic base catalyst to form block copolymers. Also shown in FIG. 14, in one or more embodiments the copolymerization schemes can comprise a catalyst switch between ROPs to form the block copolymers.

Figure 15:
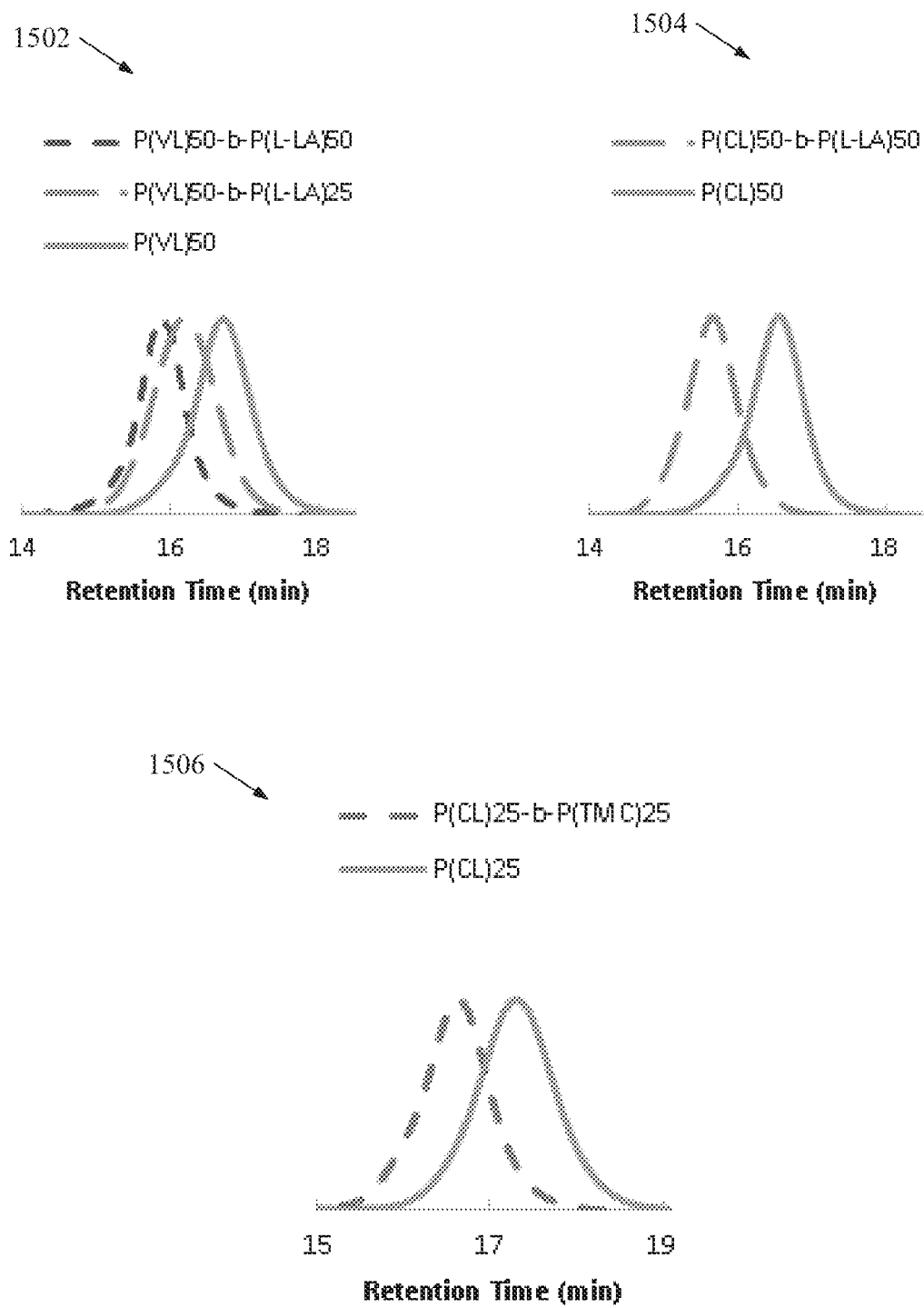
FIG. 15 illustrates a diagram of example, non-limiting graphs that can depict the efficacy of one or more exemplary polymerization schemes comprising one or more ROPs that can be performed within one or more flow reactors in accordance with one or more embodiments described herein.

FIG. 15 illustrates a diagram of example, non-limiting graphs that can demonstrate the efficacy of forming block copolymers via ROPs in the flow reactor scheme 100 in accordance with one or more embodiments described herein. Repetitive description of like elements employed in other embodiments described herein is omitted for sake of brevity. As shown in graph 1502, the GPC traces of poly(VL)$_{50}$-b-poly(L-LA)$_{25}$ and poly(VL)$_{50}$-b-poly(L-LA)$_{50}$ prepared by tBuO-K can cleanly shift to higher molecular weights from poly(VL)$_{50}$. Similarly, graph 1504 regards well-defined poly(CL)$_{50}$-b-poly(L-LA)$_{50}$ prepared by HMDS-K in accordance with one or more embodiments described herein. Also, graph 1506 regards well-defined poly(CL)$_{25}$-b-poly(TMC)$_{25}$ prepared by HMDS-K in accordance with one or more embodiments described herein. In various embodiments, the copolymers characterized by graphs 1502, 1504, and/or 1506 can be formed without a catalyst switch at least because the monomers can exhibit reactivities that do not vary drastically. The example syntheses of these block copolymers can be rapid, with residence times of less than or equal to 0.1 s.

Graph 1502 can regard copolymers synthesized with tBuO-K, GPC traces of poly(VL)$_{50}$, poly(VL)$_{50}$-b-poly(L-LA)$_{25}$ and poly(VL)$_{50}$-b-poly(L-LA)$_{50}$ characterized by: τ (VL)=8.7 ms, τ (L-LA)=88 ms. poly(VL)$_{50}$-b-poly(L-LA)$_{25}$: conversion (VL)=85%, conversion (L-LA)=83%, M$_n$=9 kDa, Đ=1.11. poly(VL)$_{50}$-b-poly(L-LA)$_{50}$: conversion (VL)=86%, conversion (L-LA)=94%, M$_n$=13 kDa, Đ=1.13. Graph 1504 can regard copolymers synthesized with HMDS-K, GPC traces of poly(CL)$_{50}$ and poly(CL)$_{50}$-b-poly(L-LA)$_{50}$ characterized by: τ (CL)=12 ms, τ (L-LA)=88 ms. poly(CL)$_{50}$-b-poly(L-LA)$_{50}$: conversion (CL)=91%, conversion (L-LA)=87%, M$_n$=15 kDa, Đ=1.13. Graph 1506 can regard copolymers synthesized with HMDS-K, GPC traces of poly(CL)$_{25}$ and poly(CL)$_{25}$-b-poly(TMC)$_{25}$ characterized by: τ (CL)=12 ms, τ (TMC)=51 ms, poly(CL)$_{25}$-b-poly(TMC)$_{25}$: conversion (CL)=87%, conversion (L-LA)=97%, M$_n$=5.5 kDa, Đ=1.13.

The following example polymerization procedures can be conducted in accordance with one or more of the copolymer polymerization schemes depicted in FIG. 14 to achieve the copolymers characterized by graph 1504. In an N$_2$ filled glovebox, a 2 M solution of CL was prepared by dissolving 2280 mg of CL (e.g., 20 mmol) in 7.8 mL of THF. A catalyst/initiator stock solution was prepared by dissolving 40.0 mg of HMDS-K (e.g., 0.2 mmol) and 86.4 mg of BnOH (e.g., 0.8 mmol) in 19.9 mL of THF. A solution of L-LA/urea was prepared by dissolving 2880 mg of L-LA (e.g., 20 mmol) and 50.9 mg of 1,3-diphenylurea (e.g., 0.24 mmol) in 7.2 mL of THF, wherein 5 mL of each solution was transferred to two 10 mL syringes respectively. A fourth syringe containing 5 mL of benzoic acid in THF was prepared.

Outside of the glovebox, the syringes containing the monomer solutions and catalyst/initiator solutions were connected to the flow reactor 102. The syringe pump was set to a flow rate of 35 mL/min for each inlet 104. The catalyst/ initiator and monomer solutions were combined via two T-mixers (e.g., 0.5 mm inner diameter). The tubing (e.g., PFA, 0.5 mm inner diameter) for the polymerization of the first block was 7 cm long, corresponding to a residence time of 0.012 s. A second T-mixer (e.g., 0.5 mm inner diameter) introduced the urea/L-LA solution into the reaction mixture. The tubing (e.g., PFA, 1.0 mm inner diameter) for the polymerization of the second block was 19 cm long, corresponding to a residence time of 0.088 s. A third T-mixer (e.g., 1 mm inner diameter) combined the benzoic acid solution with the reaction mixture to quench the reaction.

The conversion of CL was determined by integrating the peaks at 4.22 ppm (monomer) and 4.05 ppm (polymer) (NMR in $CDCl_3$). The conversion for L-LA was determined by integrating the peaks at 5.03 ppm (monomer) and 5.15 ppm (polymer) (NMR in $CDCl_3$). $DP_{NMR}$ was determined by the integrating the peak at 5.11 ppm (benzyl end group), the peak at 4.06 ppm (VL block) and the peak at 5.15 ppm (L-LA block). The crude polymer in THF was purified by precipitation into methanol and isolated via centrifugation (repeated twice) to afford a white solid after drying. The copolymers can be characterized by: conversion (CL)=87%, conversion (L-LA)=92%, $DP_{NMR}$ (CL)=45, $DP_{NMR}$ (L-LA)=52, $M_{n\ GPC}$=15 kDa, Đ=1.10. $^1$H NMR at 400 MHz, $CDCl_3$ resulted in: δ 7.32 (m, 5H), 5.13 (q, 104H), 4.02 (t, 90H), 2.27 (t, 89H), 1.61 (m, 180H), 1.55 (d, 314H), 1.35 (m, 92H).

The following example polymerization procedures can be conducted in accordance with one or more of the copolymer polymerization schemes depicted in FIG. 14 to achieve the copolymers characterized by graph 1506. In an $N_2$ filled glovebox, a 1 M solution of CL was prepared by dissolving 1140 mg of CL (e.g., 10 mmol) in 8.9 mL of THF. A catalyst/initiator stock solution was prepared by dissolving 40.0 mg of HMDS-K (e.g., 0.2 mmol) and 86.4 mg of BnOH (e.g., 0.8 mmol) in 19.9 mL of THF. A solution of TMC/urea was prepared by dissolving 510 mg (e.g., 10 mmol) and 32.7 mg of 1-phenyl-3-cyclohexyl-urea (e.g., 0.15 mmol) in 4.5 mL of THF, wherein 5 mL of each solution was transferred to two 10 mL syringes respectively. A fourth syringe containing 5 mL of benzoic acid in THF was prepared.

Outside of the glovebox, the syringes containing the monomer solutions and catalyst/initiator solutions were connected to the flow reactor 102. The syringe pump was set to a flow rate of 35 mL/min for each inlet 104. The catalyst/ initiator and monomer solutions were combined via two T-mixers (e.g., 0.5 mm inner diameter). The tubing (e.g., PFA, 0.5 mm inner diameter) for the polymerization of the first block was 7 cm long, corresponding to a residence time of 0.012 s. A second T-mixer (e.g., 0.5 mm inner diameter) introduced the TMC solution into the reaction mixture. The tubing (e.g., PFA, 1.0 mm inner diameter) for the polymerization of the second block was 11 cm long, corresponding to a residence time of 0.051 s. A third T-mixer (e.g., 1 mm inner diameter) combined the benzoic acid solution with the reaction mixture to quench the reaction.

The conversion of CL was determined by integrating the peaks at 2.64 ppm (monomer) and 2.30 ppm (polymer) (NMR in $CDCl_3$). The conversion for TMC was determined by integrating the peaks at 2.15 ppm (monomer) and 2.05 ppm (polymer) (NMR in $CDCl_3$). The copolymers can be characterized by: conversion (CL)=89%, conversion (TMC)=96%, $M_{n\ GPC}$=5.4 kDa, Đ=1.14.

Figure 16:
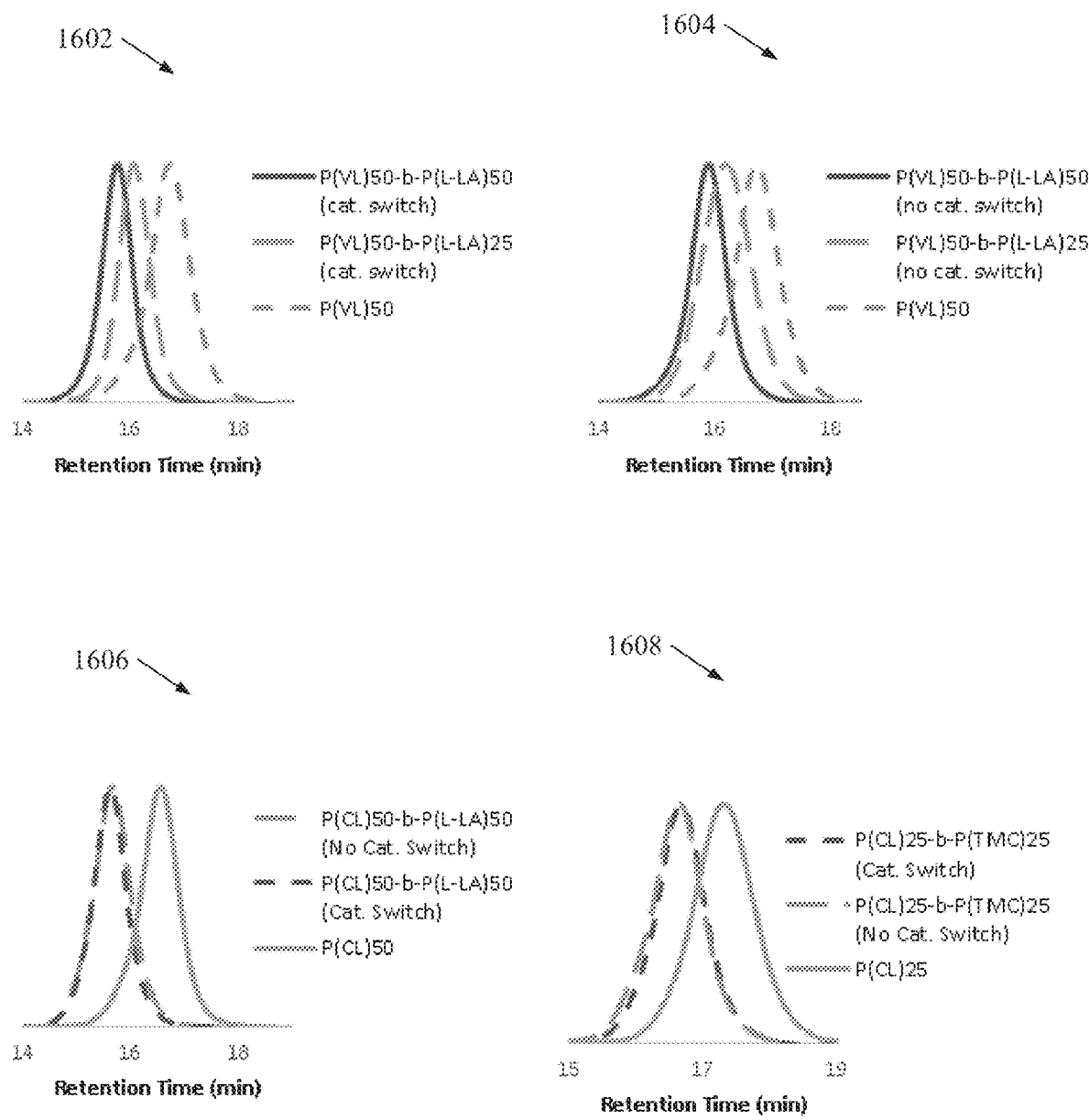
FIG. 16 illustrates a diagram of example, non-limiting graphs that can depict the efficacy of one or more exemplary polymerization schemes comprising one or more ROPs that can be performed within one or more flow reactors in accordance with one or more embodiments described herein.

FIG. 16 illustrates a diagram of example, non-limiting graphs that can further demonstrate the efficacy of forming block copolymers via ROPs in the flow reactor scheme 100 in accordance with one or more embodiments described herein. Repetitive description of like elements employed in other embodiments described herein is omitted for sake of brevity. Graphs 1602 and/or 1604 can depict a comparison of poly(VL)-poly(L-LA) block copolymer preparation with and without a catalyst switch. GPC traces of the precursor poly(VL)$_{50}$ ($M_n$=5.5 kDa, Đ=1.13) and two poly(VL)-poly (L-LA) block copolymers prepared with catalyst switch can be characterized by: poly(VL)$_{50}$-b-poly(L-LA)$_{25}$: $M_n$=10 kDa, Đ=1.08; poly(VL)$_{50}$-b-poly(L-LA)$_{50}$: $M_n$=15 kDa, Đ=1.08. GPC traces of the precursor poly(VL)$_{50}$ ($M_n$=5.5 kDa, Đ=1.13) and two poly(VL)-poly(L-LA) block copolymers prepared without a catalyst switch can be characterized by: (no bisphenylurea added with L-LA), poly(VL)$_{50}$-b-poly (L-LA)$_{25}$: $M_n$=9 kDa, Đ=1.11, poly(VL)$_{50}$-b-poly(L-LA)$_{50}$: $M_n$=13 kDa, Đ=1.13.

The following example polymerization procedures can be conducted in accordance with one or more of the copolymer polymerization schemes depicted in FIG. 14 to achieve the copolymers characterized by graphs 1602 and/or 1604. With regards to procedures with a catalyst switch, in an $N_2$ filled glovebox, a 2 M solution of VL was prepared by dissolving 2000 mg of VL (e.g., 20 mmol) in 8 mL of THF. A catalyst/initiator stock solution was prepared by dissolving 22.5 mg of tBuO-K (e.g., 0.2 mmol) and 86.4 mg of BnOH (e.g., 0.8 mmol) in 19.9 mL of THF. A solution of L-LA/urea was prepared by dissolving 1440 mg of L-LA (e.g., 20 mmol) and 50.9 mg of 1,3-diphenylurea (e.g., 0.24 mmol) in 8.6 mL of THF, wherein 5 mL of each solution was transferred to two 10 mL syringes respectively. A fourth syringe containing 5 mL of benzoic acid in THF was prepared.

Outside of the glovebox, the syringes containing the monomer solutions and catalyst/initiator solutions were connected to the flow reactor 102. The syringe pump was set to a flow rate of 35 mL/min for each inlet 104. The catalyst/ initiator and monomer solutions were combined via two T-mixers (e.g., 0.5 mm inner diameter). The tubing (e.g., PFA, 0.5 mm inner diameter) for the polymerization of the first block was 5 cm long, corresponding to a residence time of 0.0087 s. A second T-mixer (e.g., 0.5 mm inner diameter) introduced the urea/L-LA solution into the reaction mixture. The tubing (e.g., PFA, 1.0 mm inner diameter) for the polymerization of the second block was 19 cm long, corresponding to a residence time of 0.088 s. A third T-mixer (e.g., 1 mm inner diameter) combined the benzoic acid solution with the reaction mixture to quench the reaction.

The conversion of VL was determined by integrating the peaks at 4.33 ppm (monomer) and 4.06 ppm (polymer) (NMR in $CDCl_3$). The conversion for L-LA was determined by integrating the peaks at 5.03 ppm (monomer) and 5.15 ppm (polymer) (NMR in $CDCl_3$). $DP_{NMR}$ was determined by the integrating the peak at 5.11 ppm (benzyl end group), the peak at 4.06 ppm (VL block) and the peak at 5.15 ppm (L-LA block). The crude polymer in THF was purified by precipitation into methanol and isolated via centrifugation (repeated twice) to afford a white solid after drying. The copolymers can be characterized by: conversion (VL)=86%, conversion (L-LA)=91%, $DP_{NMR}$ (VL)=46, $DP_{NMR}$ (L-LA)=26, $M_{n\ GPC}$=10 kDa, Đ=1.08. $^1$H NMR at 400 MHz, $CDCl_3$ resulted in: δ 7.35 (m, 5H), 5.16 (q, 52H), 4.08 (t, 91H), 2.34 (t, 91H), 1.67 (m, 184H), 1.59 (d, 160H).

With regards to procedures without a catalyst switch, in an $N_2$ filled glovebox, a 2 M solution of VL was prepared by dissolving 2000 mg of VL (e.g., 20 mmol) in 8 mL of THF. A catalyst/initiator stock solution was prepared by dissolving 22.5 mg of tBuO-K (e.g., 0.2 mmol) and 86.4 mg of BnOH (e.g., 0.8 mmol) in 19.9 mL of THF. A 2M solution of L-LA was prepared by dissolving 2880 mg of L-LA (e.g., 40 mmol) in 7.2 mL of THF, wherein 5 mL of the 2M L-LA solution was then diluted in half for the polymerization. Also, 5 mL of each solution was transferred to two 10 mL syringes respectively. A fourth syringe containing 5 mL of benzoic acid in THF was prepared.

Outside of the glovebox, the syringes containing the monomer solutions and catalyst/initiator solutions were connected to the flow reactor 102. The syringe pump was set to a flow rate of 35 mL/min for each inlet 104. The catalyst/initiator and monomer solutions were combined via two T-mixers (e.g., 0.5 mm inner diameter). The tubing (e.g., PFA, 0.5 mm inner diameter) for the polymerization of the first block was 5 cm long, corresponding to a residence time of 0.0087 s. A second T-mixer (e.g., 0.5 mm inner diameter) introduced the L-LA solution into the reaction mixture. The tubing (e.g., PFA, 1.0 mm inner diameter) for the polymerization of the second block was 19 cm long, corresponding to a residence time of 0.088 s. A third T-mixer (e.g., 1 mm inner diameter) combined the benzoic acid solution with the reaction mixture to quench the reaction.

The conversion of VL was determined by integrating the peaks at 4.33 ppm (monomer) and 4.06 ppm (polymer) (NMR in $CDCl_3$). The conversion for L-LA was determined by integrating the peaks at 5.03 ppm (monomer) and 5.15 ppm (polymer) (NMR in $CDCl_3$). The crude polymer in THF was purified by precipitation into methanol and isolated via centrifugation (repeated twice) to afford a white solid after drying. The copolymers can be characterized by: conversion (VL)=85%, conversion (L-LA)=83%, $DP_{NMR}$ (VL)=48, $DP_{NMR}$ (L-LA)=28, $M_{n\ GPC}$=9 kDa, Đ=1.11. $^1$H NMR at 400 MHz, $CDCl_3$ resulted in: δ 7.33 (m, 5H), 5.15 (q, 56H), 4.06 (t, 96H), 2.33 (t, 96H), 1.66 (m, 196H), 1.57 (d, 173H).

Graph 1606 can depict a comparison of poly(CL)$_{50}$-b-poly(L-LA)$_{50}$ block copolymer preparation with and without a catalyst switch. GPC traces of the precursor poly(CL)$_{50}$ ($M_n$=6.1 kDa, Đ=1.12) and poly(CL)$_{50}$-b-poly(L-LA)$_{50}$ prepared with a catalyst switch can be characterized by: conversion (CL)=87%, conversion (L-LA)=92%, $M_n$=15 kDa, Đ=1.10. GPC traces of the precursor poly(CL)$_{50}$ ($M_n$=6.1 kDa, Đ=1.12) and poly(CL)$_{50}$-b-poly(L-LA)$_{50}$ prepared without catalyst switch can be characterized by: (no bisphenylurea added with L-LA): conversion (CL)=91%, conversion (L-LA)=87%, $M_n$=15 kDa, Đ=1.13.

The following example polymerization procedure can be conducted in accordance with one or more of the copolymer polymerization schemes depicted in FIG. 14 to achieve the copolymers characterized by graph 1606. With regards to procedures with a catalyst switch, in an $N_2$ filled glovebox, a 2 M solution of VL was prepared by dissolving 2000 mg of VL (e.g., 20 mmol) in 8 mL of THF. A catalyst/initiator stock solution was prepared by dissolving 22.5 mg of tBuO-K (e.g., 0.2 mmol) and 86.4 mg of BnOH (e.g., 0.8 mmol) in 19.9 mL of THF. A solution of L-LA/urea was prepared by dissolving 2880 mg of L-LA (e.g., 20 mmol) and 50.9 mg 1,3-diphenylurea (e.g., 0.24 mmol) in 7.2 mL of THF, wherein 5 mL of each solution was transferred to two 10 mL syringes respectively. A fourth syringe containing 5 mL of benzoic acid in THF was prepared.

Outside of the glovebox, the syringes containing the monomer solutions and catalyst/initiator solutions were connected to the flow reactor 102. The syringe pump was set to a flow rate of 35 mL/min for each inlet 104. The catalyst/initiator and monomer solutions were combined via two T-mixers (e.g., 0.5 mm inner diameter). The tubing (e.g., PFA, 0.5 mm inner diameter) for the polymerization of the first block was 5 cm long, corresponding to a residence time of 0.0087 s. A second T-mixer (e.g., 0.5 mm inner diameter) introduced the urea/L-LA solution into the reaction mixture. The tubing (e.g., PFA, 1.0 mm inner diameter) for the polymerization of the second block was 19 cm long, corresponding to a residence time of 0.088 s. A third T-mixer (e.g., 1 mm inner diameter) combined the benzoic acid solution with the reaction mixture to quench the reaction.

The conversion of VL was determined by integrating the peaks at 4.33 ppm (monomer) and 4.06 ppm (polymer) (NMR in $CDCl_3$). The conversion for L-LA was determined by integrating the peaks at 5.03 ppm (monomer) and 5.15 ppm (polymer) (NMR in $CDCl_3$). $DP_{NMR}$ was determined by the integrating the peak at 5.11 ppm (benzyl end group), the peak at 4.06 ppm (VL block) and the peak at 5.15 ppm (L-LA block). The crude polymer in THF was purified by precipitation into methanol and isolated via centrifugation (e.g., repeated twice) to afford a white solid after drying. The copolymers can be characterized by: conversion (VL)=85%, conversion (L-LA)=83%, $DP_{NMR}$ (VL)=48, $DP_{NMR}$ (L-LA)=28, $M_{n\ GPC}$=9 kDa, Đ=1.11. $^1$H NMR at 400 MHz, $CDCl_3$ resulted in: δ 7.35 (m, 5H), 5.16 (q, 97H), 4.08 (t, 89H), 2.34 (t, 89H), 1.68 (m, 184H), 1.59 (d, 296H).

With regards to procedures without a catalyst switch, in an $N_2$ filled glovebox, a 2 M solution of VL was prepared by dissolving 2000 mg of VL (e.g., 20 mmol) in 8 mL of THF. A catalyst/initiator stock solution was prepared by dissolving 22.5 mg of tBuO-K (e.g., 0.2 mmol) and 86.4 mg of BnOH (e.g., 0.8 mmol) in 19.9 mL of THF. A solution of L-LA was prepared by dissolving 2880 mg of L-LA (e.g., 20 mmol) in 7.2 mL of THF, wherein 5 mL of each solution was transferred to two 10 mL syringes respectively. A fourth syringe containing 5 mL of benzoic acid in THF was prepared.

Outside of the glovebox, the syringes containing the monomer solutions and catalyst/initiator solutions were connected to the flow reactor 102. The syringe pump was set to a flow rate of 35 mL/min for each inlet 104. The catalyst/initiator and monomer solutions were combined via two T-mixers (e.g., 0.5 mm inner diameter). The tubing (e.g., PFA, 0.5 mm inner diameter) for the polymerization of the first block was 5 cm long, corresponding to a residence time of 0.0087 s. A second T-mixer (e.g., 0.5 mm inner diameter) introduced the L-LA solution into the reaction mixture. The tubing (e.g., PFA, 1.0 mm inner diameter) for the polymerization of the second block was 19 cm long, corresponding to a residence time of 0.088 s. A third T-mixer (e.g., 1 mm inner diameter) combined the benzoic acid solution with the reaction mixture to quench the reaction.

The conversion of VL was determined by integrating the peaks at 4.33 ppm (monomer) and 4.06 ppm (polymer) (NMR in $CDCl_3$). The conversion for L-LA was determined by integrating the peaks at 5.03 ppm (monomer) and 5.15 ppm (polymer) (NMR in $CDCl_3$). The crude polymer in THF was purified by precipitation into methanol and isolated via centrifugation (e.g., repeated twice) to afford a white solid after drying. The copolymers can be characterized by: conversion (VL)=86%, conversion (L-LA)=94%, $DP_{NMR}$ (VL)=46, $DP_{NMR}$ (L-LA)=47, $M_{n\ GPC}$=13 kDa, Đ=1.13. $^1$H NMR at 400 MHz, $CDCl_3$ resulted in: δ 7.32 (m, 5H), 5.14 (q, 95H), 4.05 (t, 92H), 2.31 (t, 92H), 1.65 (m, 193H), 1.56 (d, 283H).

Graph 1608 can depict a comparison of poly(CL)$_{25}$-b-poly(TMC)$_{25}$ block copolymer preparation with and without a catalyst switch. GPC traces of the precursor poly(CL)$_{25}$ ($M_n$=3.3 kDa, Đ=1.14) and poly(CL)$_{25}$-b-poly(TMC)$_{25}$ prepared with a catalyst switch can be characterized by: conversion (CL)=89%, conversion (TMC)=96%, $M_n$=5.4 kDa, Đ=1.14. GPC traces of the precursor poly(CL)$_{25}$ ($M_n$=3.3 kDa, Đ=1.14) and poly(CL)$_{25}$-b-poly(TMC)$_{25}$ prepared without a catalyst switch can be characterized by: (no urea added with TMC): conversion (CL)=87%, conversion (TMC)=97%, $M_n$=5.5 kDa, Đ=1.13. The copolymers can be characterized by: conversion (VL)=86%, conversion (L-LA)=91%, $DP_{NMR}$ (VL)=45, $DP_{NMR}$ (L-LA)=48, $M_{n\ GPC}$=15 kDa, Đ=1.08.

In various embodiments, the observed rate of polymerization for the various polymerization and copolymer polymerization schemes described herein can be characterized by Equation 1 below. For example, the observed rate can be second order in base $[tBuO-K]_0$, first order in the concentration of monomer [M], and inverse first order in the concentration of alcohol [ROH]. The rate can decrease with increasing alcohol concentration and could be a result of the stabilization of the propagating alkoxide chain end by alcohols via hydrogen-bonding.

$$\frac{d[M]}{dt} = k_p \frac{[tBuO-K]_0^2[M]}{[ROH]} \quad (1)$$

Figure 17:
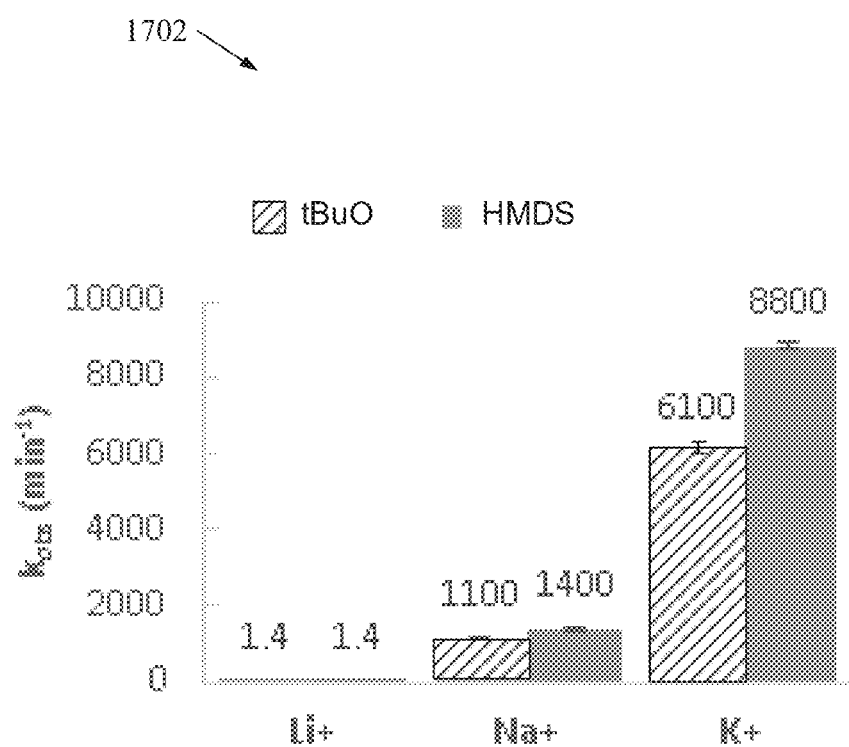
FIG. 17 illustrates a diagram of an example, non-limiting graph that can demonstrate the effect of one or more counter ions in one or more ROPs performed in one or more flow reactors in accordance with one or more embodiments described herein.

FIG. 17 illustrates a diagram of an example, non-limiting chart that can demonstrate the effect of counter-ion effects on one or more ROP in the flow reactor scheme 100 in accordance with one or more embodiments described herein. Repetitive description of like elements employed in other embodiments described herein is omitted for sake of brevity. As counter ion activity has been observed to drastically affect polymerization kinetics in the anionic polymerizations of alkenes, the effect of the cation on the organometallic bases' reactivities for the various ROPs described herein is exemplified by chart 1702. For example, $k_{obs}(Li^+) < k_{obs}(Na^+) < k_{obs}(K^+)$ for both tBuO-K and HMDS-K, which can be consistent with the weaker binding of larger cations to alkoxides, which is favorable for polymerization propagation.

FIG. 18 illustrates a flow diagram of an example, non-limiting method 1800 that can facilitate forming one or more polymers via one or more ROPs in one or more flow reactors 102 in accordance with one or more embodiments described herein. Repetitive description of like elements employed in other embodiments described herein is omitted for sake of brevity.

At 1802, the method 1800 can comprise supplying one or more organometallic base catalysts and/or primary alcohol initiators to one or more flow reactors 102. For example, the one or more organometallic base catalysts and/or primary alcohol initiators can be introduced into the one or more flow reactors 102 via one or more inlets 104 in accordance with flow reactor scheme 100. At 1804, the method 1800 can comprise supplying one or more cyclic monomers to the one or more flow reactors 102. For example, the one or more cyclic monomers can also be introduced into the one or more flow reactors 102 in accordance with the flow reactor scheme 100. At 1806, the method 1800 can comprise forming one or more polymers, via one or more ROPs within the one or more flow reactors 102, from the one or more cyclic monomers in the presence of the one or more organometallic base catalysts and/or primary alcohol initiators. For example, forming the one or more polymers at 1806 can be facilitated by the flow reactor scheme 100 and/or exemplified by the polymerization schemes depicted on FIGS. 2-3.

FIG. 19 illustrates a flow diagram of an example, non-limiting method 1900 that can facilitate forming one or more block copolymers via one or more ROPs in one or more flow reactors 102 in accordance with one or more embodiments described herein. Repetitive description of like elements employed in other embodiments described herein is omitted for sake of brevity.

At 1902, the method 1900 can comprise supplying one or more organometallic base catalysts and/or primary alcohol initiators to one or more flow reactors 102. For example, the one or more organometallic base catalysts and/or primary alcohol initiators can be introduced into the one or more flow reactors 102 via one or more inlets 104 in accordance with flow reactor scheme 100. At 1904, the method 1900 can comprise supplying one or more cyclic monomers to the one or more flow reactors 102. For example, the one or more cyclic monomers can also be introduced into the one or more flow reactors 102 in accordance with the flow reactor scheme 100. At 1906, the method 1900 can comprise forming one or more polymers, via one or more ROPs within the one or more flow reactors 102, from the one or more cyclic monomers in the presence of the one or more organometallic base catalysts and/or primary alcohol initiators.

At 1908, the method 1900 can comprise switching an active catalyst from the one or more organometallic base catalysts to one or more organocatalysts post polymerization of the polymer at 1906 via a proton transfer. For example, the proton transfer can be performed in accordance with proton transfer scheme 1300. At 1910, the method 1900 can comprise forming one or more block copolymers, via one or more second ROPs within the one or more flow reactors 102, from the one or more polymers formed at 1906 in the presence of one or more second cyclic monomers and the one or more organocatalysts. For example, forming the copolymer at 1910 can be facilitated by the flow reactor scheme 100 (e.g., as depicted in FIG. 11) and/or exemplified in the copolymer polymerization schemes depicted in FIGS. 11-12.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is, of course, not possible to describe every conceivable combination of components, products and/or methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   forming a polymer, via a ring-opening polymerization within a flow reactor, from a cyclic monomer in the presence of an organometallic base and a primary alcohol initiator, wherein the organometallic base catalyzes the ring-opening polymerization via a deprotonation of the primary alcohol.

2. The method of claim 1, wherein the cyclic monomer is selected from the group consisting of: an epoxide, an episulfide, an aziridine, a thiolactone, a cyclic ester, a cyclic amide, a cyclo-siloxane, a cyclic carbonate, a cyclic carbosilane, and a cyclic phosphoester.

3. The method of claim 1, wherein the organometallic base is selected from the group consisting of an organometallic amide and an organometallic alkoxide.

4. The method of claim 1, wherein the cyclic monomer is δ-valerolactone, and wherein the organometallic base is selected from the group consisting of potassium t-butoxide and potassium bis(trimethylsilyl)amide.

5. The method of claim 1, wherein the cyclic monomer is ε-caprolactone, and wherein the organometallic base is selected from the group consisting of potassium t-butoxide and potassium bis(trimethylsilyl)amide.

6. The method of claim 1, further comprising:
   forming a block copolymer, via a second ring-opening polymerization within the flow reactor, from the polymer in the presence of a second cyclic monomer and an organocatalyst.

7. The method of claim 6, further comprising:
   switching an active catalyst from the organometallic base to the organocatalyst post polymerization of the polymer via a proton transfer.

8. The method of claim 7, wherein the organocatalyst is selected from the group consisting of: a urea compound, a thiourea compound, and an imidazolium compound.

9. A method, comprising:
   forming a polymer, via a ring-opening polymerization within a flow reactor, from a cyclic monomer in the presence of an organometallic amide base and primary alcohol initiator.

10. The method of claim 9, wherein the cyclic monomer is selected from the group consisting of: an epoxide, an episulfide, an aziridine, a thiolactone, a cyclic ester, a cyclic amide, a cyclo-siloxane, a cyclic carbonate, a cyclic carbosilane, and a cyclic phosphoester.

11. The method of claim 9, wherein the cyclic monomer is selected from the group consisting of δ-valerolactone, ε-caprolactone, and 2,2,5,5-tetramethyl-1,2,5-oxadisilolane.

12. The method of claim 9, further comprising:
   forming a block copolymer, via a second ring-opening polymerization within the flow reactor, from the polymer in the presence of a second cyclic monomer and an organocatalyst.

13. The method of claim 12, further comprising:
   switching an active catalyst from the organometallic amide base to the organocatalyst post polymerization of the polymer via a proton transfer.

14. A method, comprising:
   forming a polymer, via a ring-opening polymerization within a flow reactor, from a cyclic monomer in the presence of an organometallic alkoxide base and primary alcohol initiator, wherein the organometallic alkoxide base catalyzes the ring-opening polymerization via a deprotonation of the primary alcohol.

15. The method of claim 14, wherein the cyclic monomer is selected from the group consisting of: an epoxide, an episulfide, an aziridine, a thiolactone, a cyclic ester, a cyclic amide, a cyclo-siloxane, a cyclic carbonate, a cyclic carbosilane, and a cyclic phosphoester.

16. The method of claim 14, wherein the cyclic monomer is selected from the group consisting of δ-valerolactone, ε-caprolactone, and 2,2,5,5-tetramethyl-1,2,5-oxadisilolane.

17. The method of claim 14, further comprising:
   forming a block copolymer, via a second ring-opening polymerization within the flow reactor, from the polymer in the presence of a second cyclic monomer and an organocatalyst.

18. The method of claim 17, further comprising:
   switching an active catalyst from the organometallic alkoxide base to the organocatalyst post polymerization of the polymer via a proton transfer.

* * * * *